US009966721B2

(12) United States Patent
Kakizaki et al.

(10) Patent No.: US 9,966,721 B2
(45) Date of Patent: May 8, 2018

(54) LASER SYSTEM

(71) Applicant: Gigaphoton Inc., Tochigi (JP)

(72) Inventors: Kouji Kakizaki, Oyama (JP); Masaki Arakawa, Oyama (JP); Kouji Ashikawa, Oyama (JP); Yasuhiro Kamba, Oyama (JP); Akiyoshi Suzuki, Oyama (JP); Osamu Wakabayashi, Oyama (JP)

(73) Assignee: Gigaphoton Inc., Tochigi (JP)

( * ) Notice: Subject to any disclaimer, the term of this patent is extended or adjusted under 35 U.S.C. 154(b) by 76 days.

(21) Appl. No.: 15/350,284

(22) Filed: Nov. 14, 2016

(65) Prior Publication Data

US 2017/0302050 A1 Oct. 19, 2017

Related U.S. Application Data

(63) Continuation of application No. PCT/JP2014/066396, filed on Jun. 20, 2014.

(51) Int. Cl.
*H01S 3/10* (2006.01)
*H01S 3/00* (2006.01)
(Continued)

(52) U.S. Cl.
CPC .......... *H01S 3/005* (2013.01); *G02B 27/0955* (2013.01); *G02B 27/123* (2013.01); *H01S 3/0071* (2013.01); *H01S 3/081* (2013.01); *H01S 3/105* (2013.01); *H01S 3/1305* (2013.01); *H01S 3/225* (2013.01); *H01S 3/2366* (2013.01); *H01S 3/2251* (2013.01); *H01S 3/2253* (2013.01); *H01S 3/2255* (2013.01); *H01S 3/2256* (2013.01)

(58) Field of Classification Search
CPC ........ H01S 3/105; H01S 3/005; H01S 3/1305; H01S 3/225; H01S 3/0071; H01S 3/2251; H01S 3/2253; H01S 3/2255; H01S 3/2256
See application file for complete search history.

(56) References Cited

U.S. PATENT DOCUMENTS 4,953,950 A * 9/1990 Arata .................... B23K 26/02 219/121.76
4,978,197 A * 12/1990 Horikawa .......... B23K 26/0604 359/629

(Continued)

FOREIGN PATENT DOCUMENTS

JP 2006-093586 A 4/2006
JP 2006-337594 A 12/2006

OTHER PUBLICATIONS

International Search Report issued in PCT/JP2014/066396; dated Jan. 13, 2015.

*Primary Examiner* — Kinam Park
(74) *Attorney, Agent, or Firm* — Studebaker & Brackett PC

(57) ABSTRACT

The laser system may include first and second laser apparatuses and a beam delivery device. The first laser apparatus may be provided so as to emit a first laser beam to the beam delivery device in a first direction. The second laser apparatus may be provided so as to emit a second laser beam to the beam delivery device in a direction substantially parallel to the first direction. The beam delivery device may be configured to bundle the first and second laser beams and to emit the first and second laser beams from the beam delivery device to a beam delivery direction different from the first direction.

18 Claims, 18 Drawing Sheets

(51) Int. Cl.

| | |
|---|---|
| ***H01S 3/105*** | (2006.01) |
| ***H01S 3/23*** | (2006.01) |
| ***H01S 3/081*** | (2006.01) |
| ***H01S 3/225*** | (2006.01) |
| ***H01S 3/13*** | (2006.01) |
| ***G02B 27/12*** | (2006.01) |
| ***G02B 27/09*** | (2006.01) |

(56) References Cited

U.S. PATENT DOCUMENTS

| | | | | |
|---|---|---|---|---|
| 5,048,911 | A | 9/1991 | Sang et al. | |
| 5,210,643 | A * | 5/1993 | Fujii | G02B 27/1006 359/618 |
| 7,061,959 | B2 | 6/2006 | Partlo et al. | |
| 8,416,500 | B2 | 4/2013 | Mitra et al. | |
| 2003/0210324 | A1 * | 11/2003 | Sung | B41J 2/473 347/241 |
| 2009/0285076 | A1 | 11/2009 | Rothenberg | |
| 2010/0103544 | A1 * | 4/2010 | Vethake | G02B 27/0905 359/850 |
| 2012/0307851 | A1 * | 12/2012 | Hori | H01S 3/2308 372/27 |

* cited by examiner

LASER SYSTEM

TECHNICAL FIELD

The present disclosure relates to a laser system.

BACKGROUND ART

A laser annealing apparatus may apply a pulse laser beam on an amorphous silicon film formed on a substrate. The pulse laser beam may be emitted from a laser system such as an excimer laser system. The pulse laser beam may have a wavelength of ultraviolet light region. Such pulse laser beam may reform the amorphous silicon film to a poly-silicon film. The poly-silicon film can be used to form thin film transistors (TFTs). The TFTs may be used in large sized liquid crystal displays.

SUMMARY

A laser system according to one aspect of the present disclosure may include first and second laser apparatuses and a beam delivery device. The first laser apparatus may be provided so as to emit a first laser beam to the beam delivery device in a first direction. The second laser apparatus may be provided so as to emit a second laser beam to the beam delivery device in a direction substantially parallel to the first direction. The beam delivery device may be configured to bundle the first and second laser beams and to emit the first and second laser beams from the beam delivery device to a beam delivery direction different from the first direction.

A laser system according to another aspect of the present disclosure may include first to fourth laser apparatuses and a beam delivery device. The first laser apparatus may be provided so as to emit a first laser beam to the beam delivery device in a first direction. The second laser apparatus may be provided so as to emit a second laser beam to the beam delivery device in a direction substantially parallel to the first direction. The third laser apparatus may be provided so as to emit a third laser beam to the beam delivery device in a second direction different from the first direction. The fourth laser apparatus may be provided so as to emit a fourth laser beam to the beam delivery device in a direction substantially parallel to the second direction. The beam delivery device may be configured to bundle the first to fourth laser beams and to emit the first to fourth laser beams from the beam delivery device to a beam delivery direction different from any one of the first direction and the second direction.

BRIEF DESCRIPTION OF DRAWINGS

Exemplary embodiments of the present disclosure will be described below with reference to the appended drawings.

DESCRIPTION OF EMBODIMENTS

Contents

1. Outline
2. Overall Description of Laser Annealing Apparatus
  2.1 Laser System
  2.2 Beam Combiner System
  2.3 Exposure Apparatus
3. Laser System of Embodiment
  3.1 Plurality of Laser Apparatuses
  3.2 Beam Delivery Device
4. Arrangement of Laser Apparatuses in Laser System
5. Laser Apparatus
6. Optical Path Length Adjuster
7. Beam Divergence Adjuster
8. Mirror-Moving Mechanism
9. Beam Combiner Including Fly Eye Lens
10. Beam Parameter Measuring Device
11. Controller
12. Controlling Operation
13. Configuration of Controller Embodiments of the present disclosure will be described below in detail with reference to the drawings. The embodiments described below may represent several examples of the present disclosure, and may not intend to limit the content of the present disclosure. Not all of the configurations and operations described in the embodiments are indispensable in the present disclosure. Identical reference symbols may be assigned to identical elements and redundant descriptions may be omitted.

1. Outline

A laser annealing apparatus may perform laser annealing by irradiating an amorphous silicon film on a glass substrate with a pulse laser beam. The pulse laser beam may be demanded to increase its energy per one pulse for enlarging irradiation area at the predetermined energy density to manufacture larger and larger liquid crystal displays as in recent years. Increasing energy per one pulse may be achieved by bundling pulse laser beams emitted from respective laser apparatuses to form a bundled laser beam which may be applied to the amorphous silicon film.

However, such laser apparatuses and a beam delivery device constituting a laser system may require an expanded installation area or cause a shortage of maintenance space. The beam delivery device is a device to bundle the pulse laser beams emitted from the laser apparatuses.

According to one aspect of the present disclosure, a first laser apparatus may be provided so as to emit a first laser beam to the beam delivery device in a first direction. The second laser apparatus may be provided so as to emit a second laser beam to the beam delivery device in a direction substantially parallel to the first direction. The beam delivery device may be configured to bundle the first and second laser beams and to emit them as a bundled laser beam from the beam delivery device to a beam delivery direction different from the first direction. According to this configuration, the beam delivery device may emit the first and second laser beams, which came along the first direction, to the beam delivery direction. This may achieve reducing an installation area of the laser system and securing a maintenance space.

2. Overall Description of Laser Annealing Apparatus

Figure 1:
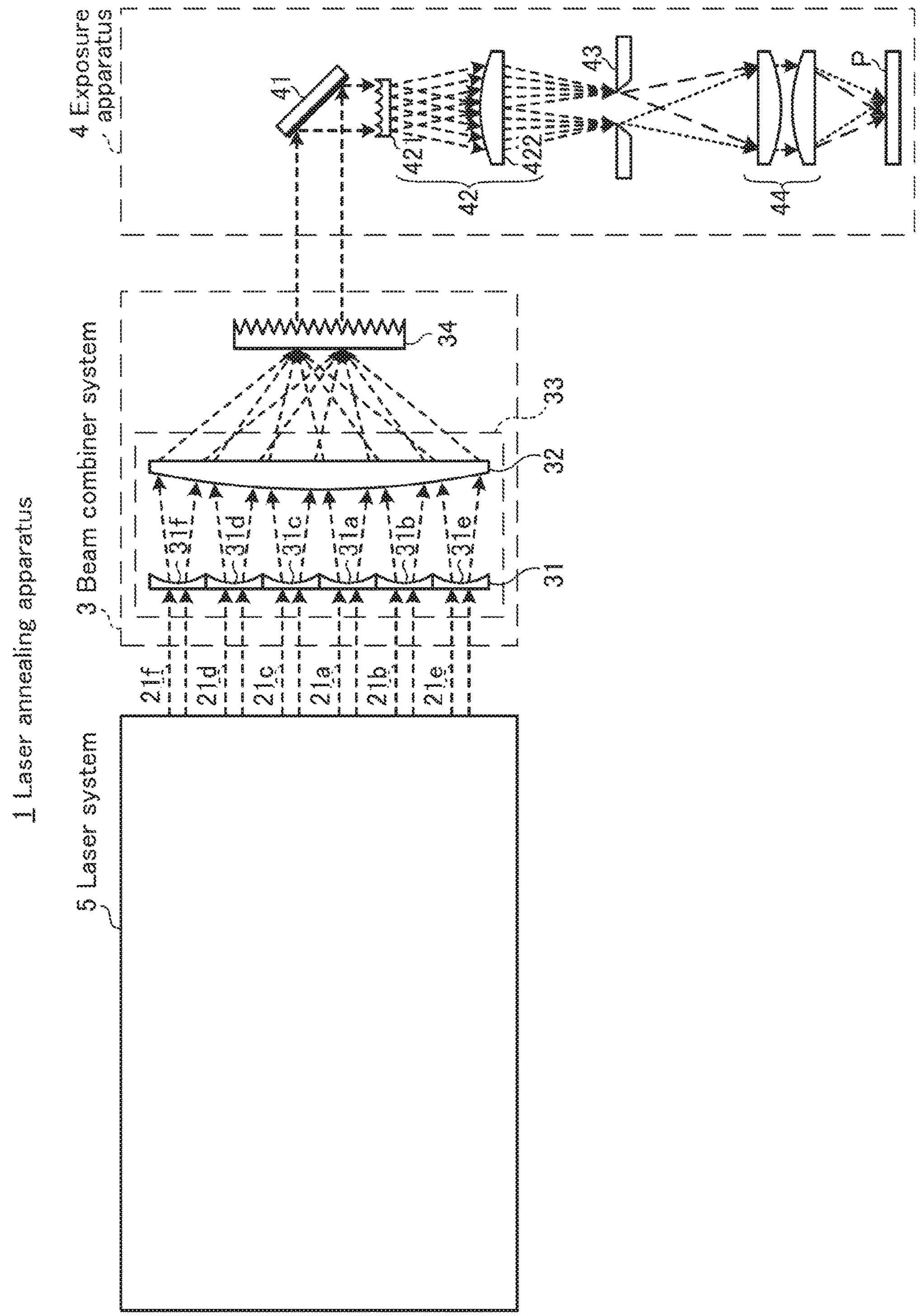
FIG. 1 schematically shows a configuration of a laser annealing apparatus 1 including an exemplary laser system 5.

FIG. 1 schematically shows a configuration of a laser annealing apparatus 1 including an exemplary laser system 5. The laser annealing apparatus 1 may include the laser system 5, a beam combiner system 3, and an exposure apparatus 4.

2.1 Laser System

The laser system 5 may bundle first to sixth pulse laser beams 21*a* to 21*f* emitted from respective laser apparatuses explained below and emit these pulse laser beams. The first to sixth pulse laser beams 21*a* to 21*f* emitted from the laser system may have optical path axes substantially parallel to each other. The "optical path axis" of the pulse laser beam may be a central axis of the optical path of the pulse laser beam.

2.2 Beam Combiner System

The beam combiner system 3 may include incident optics 33 and a beam combiner 34.

The incident optics 33 may include secondary light source optics 31 and condenser optics 32, being designed to constitute a Koehler illumination.

The secondary light source optics 31 may include first to sixth concave lenses 31*a* to 31*f*.

The first concave lens 31*a* may be provided between the laser system 5 and the condenser optics 32 in the optical path of a first pulse laser beam 21*a*. The first concave lens 31*a* may transmit the first pulse laser beam 21*a* toward the condenser optics 32. The first concave lens 31*a* may expand beam width of the first pulse laser beam 21*a*.

The first to sixth concave lenses 31*a* to 31*f* may have substantially the same configurations with each other.

The second concave lens 31*b* may be provided in the optical path of a second pulse laser beam 21*b*.

The third concave lens 31*c* may be provided in the optical path of a third pulse laser beam 21*c*.

The fourth concave lens 31*d* may be provided in the optical path of a fourth pulse laser beam 21*d*.

The fifth concave lens 31*e* may be provided in the optical path of a fifth pulse laser beam 21*e*.

The sixth concave lens 31*f* may be provided in the optical path of a sixth pulse laser beam 21*f*.

The first to sixth pulse laser beams 21*a* to 21*f* entering the first to sixth concave lenses 31*a* to 31*f*, respectively, may have substantially the same beam sizes and substantially the same beam divergences with each other.

The optical path axes of the first to sixth pulse laser beams 21*a* to 21*f* transmitted by the first to sixth concave lenses 31*a* to 31*f*, respectively, may be substantially parallel to each other.

The condenser optics 32 may be provided such that, as explained below, the first to sixth pulse laser beams 21*a* to 21*f* may be made incident on substantially the same portion of a light-receiving surface of the beam combiner 34 at respective predetermined incident angles.

The condenser optics 32 may extend over the cross sections of the optical paths of the first to sixth pulse laser beams 21*a* to 21*f*, at a position between the secondary light source optics 31 and the beam combiner 34. The condenser optics 32 may transmit the first to sixth pulse laser beams 21*a* to 21*f* toward the beam combiner 34. The condenser optics 32 may change respective directions of the optical path axes of the first to the sixth pulse laser beams 21*a* to 21*f* to respective predetermined directions.

The condenser optics 32 may be provided such that a front-side focal plane of the condenser optics 32 substantially coincides with respective focal positions of the first to the sixth concave lenses 31*a* to 31*f*. The condenser optics 32 may thus collimate each of the first to sixth pulse laser beams 21*a* to 21*f* transmitted by the first to sixth concave lenses 31*a* to 31*f*, respectively, such that each of the beams has substantially parallel rays.

The condenser optics 32 may be provided such that a rear-side focal plane of the condenser optics 32 substantially coincides with the light-receiving surface of the beam combiner 34. Thus, the condenser optics 32 may make the first to sixth pulse laser beams 21*a* to 21*f* be incident on substantially the same portion of the beam combiner 34 at respective predetermined incident angles.

FIG. 1 shows that the condenser optics 32 may include a single convex lens. However, the condenser optics 32 may include a combination of the convex lens and another convex or concave lens (not shown), or include a concave mirror (not shown).

The beam combiner 34 may include a diffractive optical element (DOE). The diffractive optical element may be constituted by an ultraviolet-transmitting substrate, such as a synthetic quartz substrate or a calcium fluoride substrate, on which multiple grooves each having a predetermined shape are formed at a predetermined interval.

The first to sixth pulse laser beams 21*a* to 21*f*, which were changed their directions of the optical path axes by the condenser optics 32 to the respective predetermined directions, may enter the beam combiner 34. The first to sixth pulse laser beams 21*a* to 21*f*, which entered the beam combiner 34, may be emitted from the beam combiner 34 to directions substantially the same with each other. The above-mentioned respective predetermined directions may be designed such that the first to sixth pulse laser beams 21*a* to

21*f* are combined by the beam combiner 34. Such beam combiner 34 may be a diffractive optical element, for example, disclosed in U.S. Patent Application Publication No. 2009/0285076.

The first to sixth pulse laser beams 21*a* to 21*f* emitted from the beam combiner 34 may travel through substantially the same optical paths to enter the exposure apparatus 4.

The first to sixth pulse laser beams 21*a* to 21*f* may thus be combined by the beam combiner system 3. In the following description, a pulse laser beam formed by combining the first to sixth pulse laser beams 21*a* to 21*f* may be referred to as a "combined laser beam". The combined laser beam may include the first to sixth pulse laser beams 21*a* to 21*f*. The total pulse energy of the combined laser beam may be approximately six times of the pulse energy of the pulse laser beam emitted from a single laser apparatus. "Combining" pulse laser beams may include making first and second pulse laser beams share a common optical path.

2.3 Exposure Apparatus

The exposure apparatus 4 may include a high-reflective mirror 41, illumination optics 42, a mask 43, and transfer optics 44. The exposure apparatus 4 may apply the combined laser beam, which is emitted from the beam combiner system 3, to an irradiation object P according to a predetermined mask pattern.

The high-reflective mirror 41 may be provided in an optical path of the pulse laser beam emitted from the beam combiner system 3. The high-reflective mirror 41 may reflect the combined laser beam emitted from the beam combiner system 3 to make the combined laser beam enter the illumination optics 42. The combined laser beam entering the illumination optics 42 may have substantially parallel rays.

The illumination optics 42 may be provided between the high-reflective mirror 41 and the mask 43 in the optical path of the combined laser beam emitted from the beam combiner system 3. The illumination optics 42 may include a fly eye lens 421 and condenser optics 422, being designed to constitute a Koehler illumination.

The fly eye lens 421 may be provided between the high-reflective mirror 41 and the condenser optics 422 in the optical path of the combined laser beam emitted from the beam combiner system 3. The fly eye lens 421 may include a plurality of lenses arranged in a cross section of the combined laser beam. The lenses may transmit respective parts of the combined laser beam toward the condenser optics 422 to expand beam widths of the respective parts.

The condenser optics 422 may be provided between the fly eye lens 421 and the mask 43 in the optical path of the combined laser beam emitted from the beam combiner system 3. The condenser optics 422 may irradiate the mask 43 with the combined laser beam emitted from the fly eye lens 421.

The condenser optics 422 may be provided such that a rear-side focal plane of the condenser optics 422 substantially coincides with a position of the mask 43. The condenser optics 422 may thus irradiate substantially the same portion of the mask 43 with the respective parts of the combined laser beam transmitted by the respective lenses of the fly eye lens 421.

FIG. 1 shows that the condenser optics 422 may include a single convex lens. However, the condenser optics 422 may include a combination of the convex lens and another convex or concave lens (not shown), or include a concave mirror (not shown).

According to the above-mentioned configuration, the illumination optics 42 may reduce variation in light intensity in a cross section of the combined laser beam, with which the mask 43 is irradiated.

The mask 43 may have a rectangular slit. The shape of the slit may form the mask pattern of the mask 43. The mask pattern of the mask 43 may not be limited to have the rectangular shape. The mask pattern may have any desired shape.

The transfer optics 44 may be provided between the mask 43 and the irradiation object P in the optical path of the combined laser beam emitted from the beam combiner system 3. The transfer optics 44 may be provided such that an image of the mask 43 is transferred by the transfer optics 44 at a position substantially coinciding with a position where the irradiation object P shall be irradiated with the combined laser beam. The transfer optics 44 may thus transfer the mask pattern of the mask 43, irradiated with the combined laser beam, to the irradiation object P.

The transfer optics 44 may include at least one convex lens. In another example, the transfer optics 44 may include a combination of a convex lens and a concave lens, or include a concave mirror. In still another example, the transfer optics 44 may include a cylindrical lens that transfers a lateral component of an image of the rectangular mask pattern to the irradiation object P.

The laser system 5 may thus emit, through the beam combiner system 3, the combined laser beam having higher pulse energy than the pulse energy of the pulse laser beam emitted from the single laser apparatus. Consequently, the laser annealing apparatus 1 may irradiate a large irradiation area of the large-sized irradiation object P with the combined laser beam at a predetermined pulse energy density required for annealing. Thus, large-sized liquid crystal displays may be efficiently manufactured.

In the above disclosure, the substantially parallel pulse laser beams 21*a* to 21*f* emitted from the laser system 5 are combined by the beam combiner system 3 and then made enter the illumination optics 42 of the exposure apparatus 4. However, the present disclosure is not limited to this. Without the beam combiner system 3, the substantially parallel pulse laser beams 21*a* to 21*f* emitted from the laser system 5 may enter the illumination optics 42 of the exposure apparatus 4.

3. Laser System of Embodiment

Figures 2A, 2B:
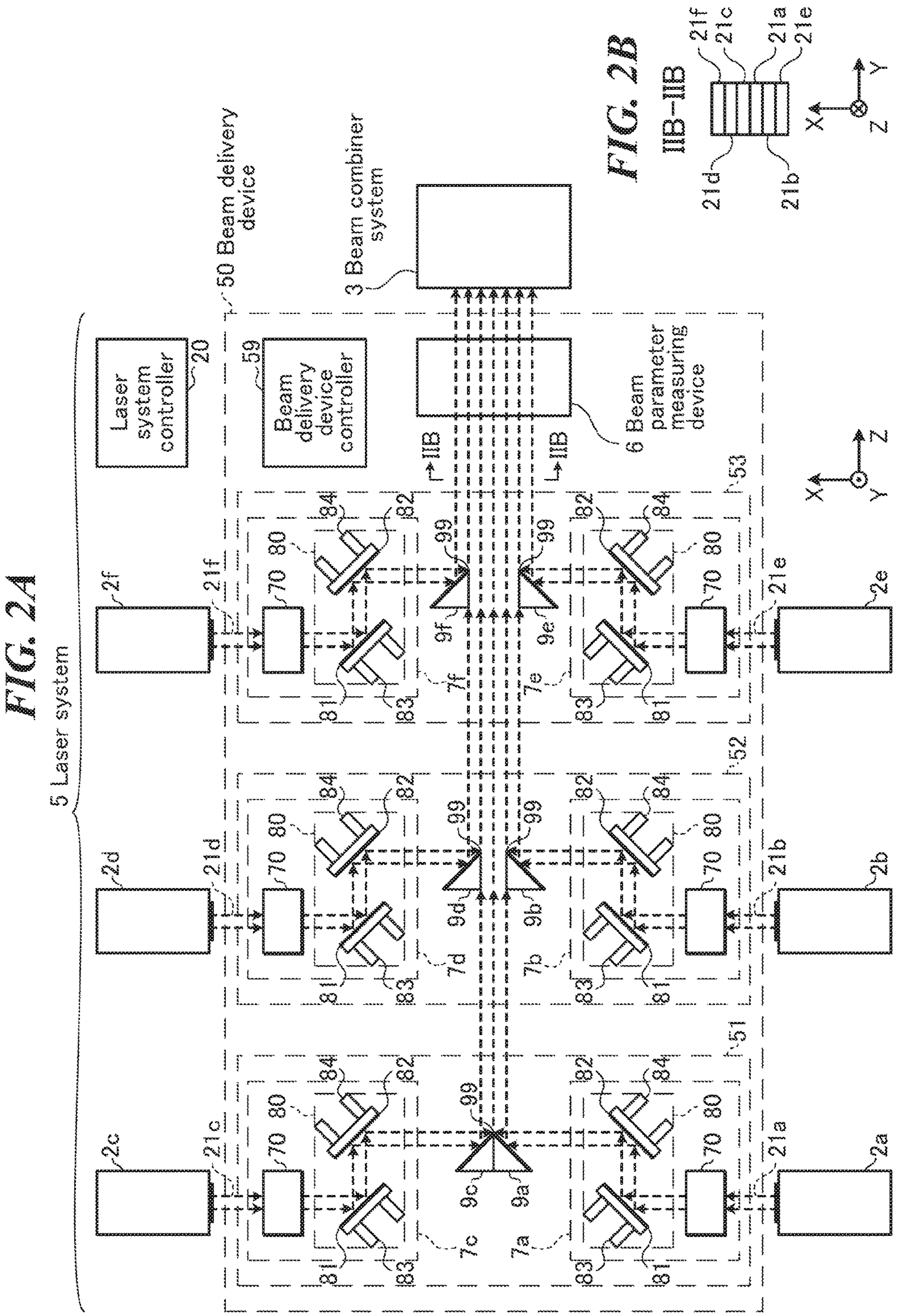
FIG. 2A schematically shows a configuration of a laser system according to a first embodiment of the present disclosure.
FIG. 2B shows a cross section of first to sixth pulse laser beams 21*a* to 21*f* at a line IIB-IIB in FIG. 2A.

FIG. 2A schematically shows a configuration of a laser system according to a first embodiment of the present disclosure. The laser system 5 may include laser apparatuses 2*a* to 2*f*, a beam delivery device 50, and a laser system controller 20.

3.1 Plurality of Laser Apparatuses

The laser apparatuses 2*a* to 2*f* may include a first laser apparatus 2*a*, a second laser apparatus 2*b*, a third laser apparatus 2*c*, a fourth laser apparatus 2*d*, a fifth laser apparatus 2*e*, and a sixth laser apparatus 2*f*. FIG. 1 shows the six laser apparatuses 2*a* to 2*f*; however, the number of the laser apparatuses may not be limited but may be an integer equal to or more than two.

Each of the first to sixth laser apparatuses 2*a* to 2*f* may be an excimer laser apparatus using laser medium such as XeF, XeCl, KrF, or ArF. The first to sixth laser apparatuses 2*a* to 2*f* may have substantially the same configurations with each other. The first to sixth laser apparatuses 2*a* to 2*f* may receive respective trigger signals from the laser system controller 20, and emit the first to sixth pulse laser beams 21*a* to 21*f*, respectively. Each of the first to sixth pulse laser beams 21*a* to 21*f* may have a wavelength of an ultraviolet region.

The first laser apparatus 2a may be provided so as to emit the first pulse laser beam 21a to the beam delivery device 50 in a first direction. The first direction may correspond to an X direction in FIG. 2A.

The second and fifth laser apparatuses 2b and 2e may be provided to emit the second and fifth pulse laser beams 21a and 21e, respectively, to the beam delivery device 50 in directions substantially parallel to the first direction. The first, second, and fifth laser apparatuses 2a, 2b, and 2e may be oriented in directions substantially the same with each other.

The third laser apparatus 2c may be provided so as to emit the third pulse laser beam 21c to the beam delivery device 50 in a second direction different from the first direction. The second direction may correspond to a −X direction in FIG. 2A.

The fourth and sixth laser apparatuses 2d and 2f may be provided to emit the fourth and sixth pulse laser beams 21d and 21f, respectively, to the beam delivery device 50 in directions substantially parallel to the second direction. The third, fourth, and sixth laser apparatuses 2c, 2d, and 2f may be oriented in directions substantially the same with each other.

The first and third laser apparatuses 2a and 2c may be provided opposite to each other, with the beam delivery device 50 between them.

The second and fourth laser apparatuses 2b and 2d may be provided opposite to each other, with the beam delivery device 50 between them.

The fifth and sixth laser apparatuses 2e and 2f may be provided opposite to each other, with the beam delivery device 50 between them.

3.2 Beam Delivery Device

The beam delivery device 50 may include a plurality of beam adjusters 7a to 7f, a plurality of mirrors 9a to 9f, and a beam delivery device controller 59.

The number of the beam adjusters 7a to 7f may correspond to the number of the laser apparatuses 2a to 2f. The plurality of beam adjusters 7a to 7f may include first to sixth beam adjusters 7a to 7f. The number of the mirrors 9a to 9f may correspond to the number of the laser apparatuses 2a to 2f. The plurality of mirrors 9a to 9f may include first to sixth mirrors 9a to 9f.

The first to sixth beam adjusters 7a to 7f may be provided in the optical paths of the first to sixth pulse laser beams 21a to 21f, respectively. The first to sixth pulse laser beams 21a to 21f emitted from the first to sixth beam adjusters 7a to 7f, respectively, may be incident on the first to sixth mirrors 9a to 9f, respectively.

The first beam adjuster 7a may include a beam adjusting unit 70 and a beam steering unit 80. The beam adjusting unit 70 included in the first beam adjuster 7a may adjust optical path length or beam divergence of the first pulse laser beam 21a.

The beam steering unit 80 included in the first beam adjuster 7a may adjust optical path axis of the first pulse laser beam 21a. The beam steering unit 80 may include a first high-reflective mirror 81, a second high-reflective mirror 82, and actuators 83 and 84.

The first high-reflective mirror 81 may be provided in the optical path of the first pulse laser beam 21a emitted from the beam adjusting unit 70. The actuator 83 may change the posture of the first high-reflective mirror 81 according to a driving signal outputted by the beam delivery device controller 59. The first high-reflective mirror 81 may reflect the first pulse laser beam 21a to a direction according to the posture adjusted by the actuator 83. For example, the actuator 83 may be capable of changing posture angle of the first high-reflective mirror 81 in two directions perpendicular to each other.

The second high-reflective mirror 82 may be provided in the optical path of the first pulse laser beam 21a reflected by the first high-reflective mirror 81. The actuator 84 may change the posture of the second high-reflective mirror 82 according to a driving signal outputted by the beam delivery device controller 59. The second high-reflective mirror 82 may reflect the first pulse laser beam 21a to a direction according to the posture adjusted by the actuator 84. For example, the actuator 84 may be capable of changing posture angle of the second high-reflective mirror 82 in two directions perpendicular to each other.

The optical path axis of the first pulse laser beam 21a reflected by the second high-reflective mirror 82 may be substantially parallel to the first direction. The first pulse laser beam 21a reflected by the second high-reflective mirror 82 may be incident on the first mirror 9a.

The beam steering unit 80 may thus control a travelling direction of the pulse laser beam and a position of the pulse laser beam.

Descriptions for the first beam adjuster 7a were made in the above. The first to sixth beam adjusters 7a to 7f may have substantially the same configurations with each other.

The first to sixth mirrors 9a to 9f may be provided in the optical paths of the first to sixth pulse laser beams 21a to 21f, respectively, emitted from the first to sixth beam adjusters 7a to 7f, respectively. Each of the first to sixth mirrors 9a to 9f may have a triangular prism shape whose base surface has a nearly right-angled isosceles triangular shape. Each of these mirrors may be a prism mirror having a high-reflective film coated on one side surface of the triangular prism. Each of the first to sixth mirrors 9a to 9f may have a knife edge 99 that is the nearest from the beam combiner system 3 among three vertical edges. The knife edge 99 may be formed by two side surfaces contacting at an angle of 45 degrees or less. Each of the first to sixth mirrors 9a to 9f is not limited to a prism mirror. Each mirror may be formed by a substrate having a knife edge 99 and coated with a high-reflective film (see FIGS. 12A to 12C).

Reflective surfaces of the first, second, and fifth mirrors 9a, 9b, and 9e, each coated with the high-reflective film, may be substantially parallel to each other. Reflective surfaces of the third, fourth, and sixth mirrors 9c, 9d, and 9f, each coated with the high-reflective film, may be substantially parallel to each other.

The first to sixth pulse laser beams 21a to 21f may be incident on the respective reflective surfaces of the first to sixth mirrors 9a to 9f, at the respective portions adjacent to the knife edges 99. The first to sixth pulse laser beams 21a to 21f may be reflected by the first to sixth mirrors 9a to 9f, respectively, to the beam delivery direction. The beam delivery direction may correspond to the Z direction in FIG. 2A. The optical path axes of the first to sixth pulse laser beams 21a to 21f reflected by the first to sixth mirrors 9a to 9f, respectively, may be substantially parallel to each other.

The first and third mirrors 9a and 9c may be provided adjacent to each other. The knife edges 99 of the first and third mirrors 9a and 9c may be in contact with each other. The first and third mirrors 9a and 9c and the first and third beam adjusters 7a and 7c may constitute a first unit 51 of the beam delivery device 50.

The second and fourth mirrors 9b and 9d may have a first predetermined gap between them. The second and fourth mirrors 9*b* and 9*d* and the second and fourth beam adjusters 7*b* and 7*d* may constitute a second unit 52 of the beam delivery device 50.

The first and third pulse laser beams 21*a* and 21*c* reflected by the first and third mirrors 9*a* and 9*c*, respectively, may pass through the gap between the second and fourth mirrors 9*b* and 9*d*.

The fifth and sixth mirrors 9*e* and 9*f* may have a second predetermined gap between them. The fifth and sixth mirrors 9*e* and 9*f* and the fifth and sixth beam adjusters 7*e* and 7*f* may constitute a third unit 53 of the beam delivery device 50.

The first and third pulse laser beams 21*a* and 21*e* reflected by the first and third mirrors 9*a* and 9*c*, respectively, may pass through the gap between the fifth and sixth mirrors 9*e* and 9*f*. The second and fourth pulse laser beams 21*b* and 21*d* reflected by the second and fourth mirrors 9*b* and 9*d*, respectively, may also pass through the gap between the fifth and sixth mirrors 9*e* and 9*f*.

As described above, the beam delivery device 50 may bundle the first to sixth pulse laser beams 21*a* to 21*f*. In the following description, a plurality of pulse laser beams bundled by the beam delivery device 50 may be referred to as a "bundled laser beam". "Bundling" pulse laser beams may include emitting both a first pulse laser beam incident in a first direction and a second pulse laser beam incident in a second direction, to a third direction. The first direction and the second direction may be substantially the same directions or different directions. The third direction may be a different direction from both of the first and second directions. The first and second pulse laser beams emitted to the third direction may be adjacent to each other. The third direction may be perpendicular to both the first and second directions.

FIG. 2B, shows a cross section of the first to sixth pulse laser beams 21*a* to 21*f* at a line IIB-IIB in FIG. 2A. Cross sectional shapes of the first to sixth pulse laser beams 21*a* to 21*f* may be substantially the same with each other. The optical path axes of the first to sixth pulse laser beams 21*a* to 21*f* reflected by the first to sixth mirrors 9*a* to 9*f*, respectively, may be positioned in a single plane substantially parallel to the beam delivery direction. The optical paths of the first and third pulse laser beams 21*a* and 21*c* may be positioned between the optical paths of the second and fourth pulse laser beams 21*b* and 21*d*. The optical paths of the second and fourth pulse laser beams 21*b* and 21*d* may be positioned between the optical paths of the fifth and sixth pulse laser beams 21*e* and 21*f*. Two pulse laser beams of the first to sixth pulse laser beams 21*a* to 21*f* next to each other may be adjacent to each other.

4. Arrangement of Laser Apparatuses in Laser System

Figures 3A, 3B:
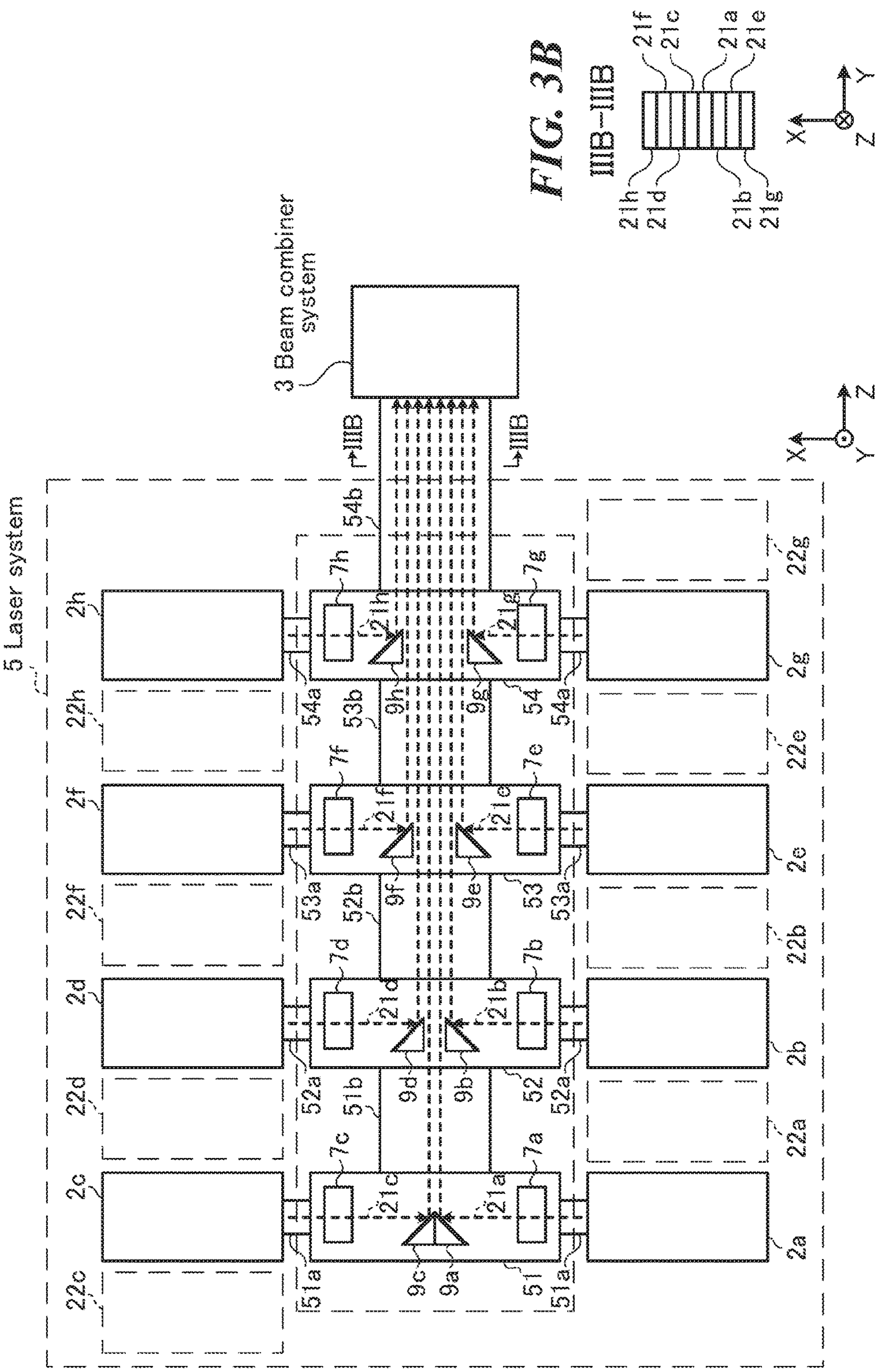
FIG. 3A schematically shows a configuration of a laser system according to a second embodiment of the present disclosure.
FIG. 3B shows a cross section of the first to eighth pulse laser beams 21*a* to 21*h* at a line IIIB-IIIB in FIG. 3A.

FIG. 3A schematically shows a configuration of a laser system according to a second embodiment of the present disclosure. The laser system 5 according to the second embodiment may include the first to sixth laser apparatuses 2*a* to 2*f* and seventh and eighth laser apparatuses 2*g* and 2*h*. Further, the laser system 5 according to the second embodiment may include the first to sixth beam adjusters 7*a* to 7*f* and seventh and eighth beam adjusters 7*g* and 7*h*. Further, the laser system 5 according to the second embodiment may include the first to sixth mirrors 9*a* to 9*f* and seventh and eighth mirrors 9*g* and 9*h*. The seventh and eighth mirrors 9*g* and 9*h* and the seventh and eighth beam adjusters 7*g* and 7*h* may constitute a fourth unit 54 of the beam delivery device 50.

Thus, the fourth unit 54 constituting the beam delivery device 50 may be added and the seventh and eighth laser apparatuses 2*g* and 2*h* may be added. According to this configuration, still more pulse laser beams may be bundled to be inputted to the beam combiner system 3. The seventh and eighth mirrors 9*g* and 9*h* may have a third predetermined gap between them. The first to sixth pulse laser beams 21*a* to 21*f* reflected by the first to sixth mirrors 9*a* to 9*f*, respectively, may pass through the gap between the seventh and eighth mirrors 9*g* and 9*h*.

FIG. 3B shows a cross section of the first to eighth pulse laser beams 21*a* to 21*h* at a line IIIB-IIIB in FIG. 3A. Cross sectional shapes of the first to eighth pulse laser beams 21*a* to 21*h* may be substantially the same with each other. The optical path axes of the first to eighth pulse laser beams 21*a* to 21*h* reflected by the first to eighth mirrors 9*a* to 9*h*, respectively, may be positioned in a single plane substantially parallel to the beam delivery direction. The optical paths of the first to sixth pulse laser beams 21*a* to 21*f* may be positioned between the optical paths of the seventh and eighth pulse laser beams 21*g* and 21*h*. Two pulse laser beams of the first to eighth pulse laser beams 21*a* to 21*h* next to each other may be adjacent to each other.

Similarly, a fifth unit (not shown) may be added to the beam delivery device 50 and ninth and tenth laser apparatuses (not shown) may be added.

By the way, the first to eighth laser apparatuses 2*a* to 2*h* may require maintenance areas 22*a* to 22*h*, respectively, each on a right side with respect to the emitting direction of the pulse laser beam. Each of the maintenance areas 22*a* to 22*h* may serve as a working space for retrieving or exchanging various components of each laser apparatus. The second embodiment shown in FIG. 3A may secure the maintenance areas 22*a* to 22*h* for the laser apparatuses 2*a* to 2*h*, while making an installing space compact for the laser system 5 including the laser apparatuses 2*a* to 2*h*.

The first to fourth units 51 to 54 may be stored in respective housings. The first laser apparatus 2*a* and the first unit 51 may be connected by a beam path tube 51*a*. The third laser apparatus 2*c* and the first unit 51 may be connected by another beam path tube 51*a*. The second laser apparatus 2*b* and the second unit 52 may be connected by a beam path tube 52*a*. The fourth laser apparatus 2*d* and the second unit 52 may be connected by another beam path tube 52*a*. The fifth laser apparatus 2*e* and the third unit 53 may be connected by a beam path tube 53*a*. The sixth laser apparatus 2*f* and the third unit 53 may be connected by another beam path tube 53*a*. The seventh laser apparatus 2*g* and the fourth unit 54 may be connected by a beam path tube 54*a*. The eighth laser apparatus 2*h* and the fourth unit 54 may be connected by another beam path tube 54*a*. The first unit 51 and the second unit 52, the second unit 52 and the third unit 53, the third unit 53 and the fourth unit 54, and the fourth unit 54 and the beam combiner system 3 may be connected by beam path tubes 51*b*, 52*b*, 53*b*, and 54*b*, respectively. Interior of each of the beam path tubes may be purged with an inert gas. For example, the inert gas may include high purity nitrogen gas, helium gas, or argon gas.

Figure 4:
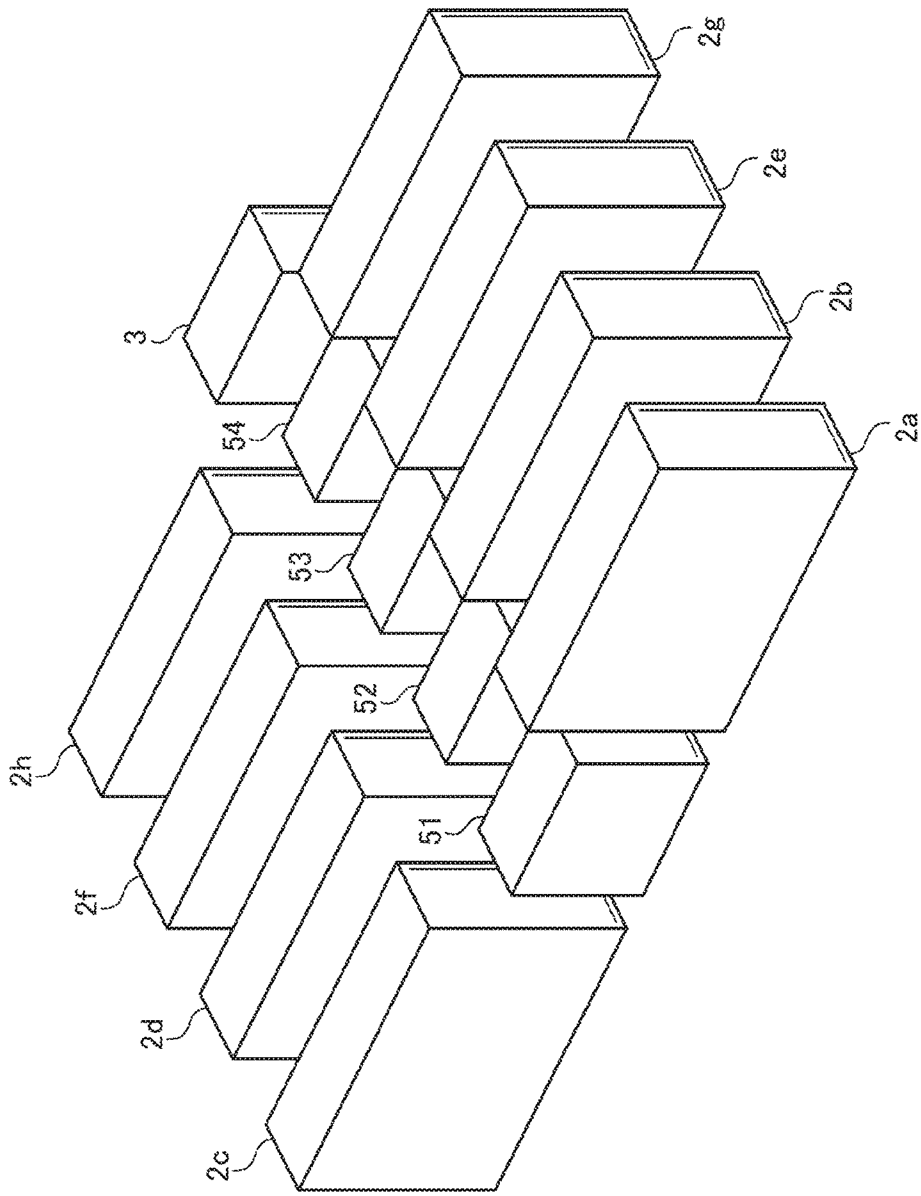
FIG. 4 schematically shows an arrangement of the laser system shown in FIG. 3A.

FIG. 4 schematically shows an arrangement of the laser system shown in FIG. 3A. The second embodiment may secure the maintenance areas 22*a* to 22*h*, while making an installing space compact for the laser system 5 including the laser apparatuses 2*a* to 2*h*.

Figure 5:
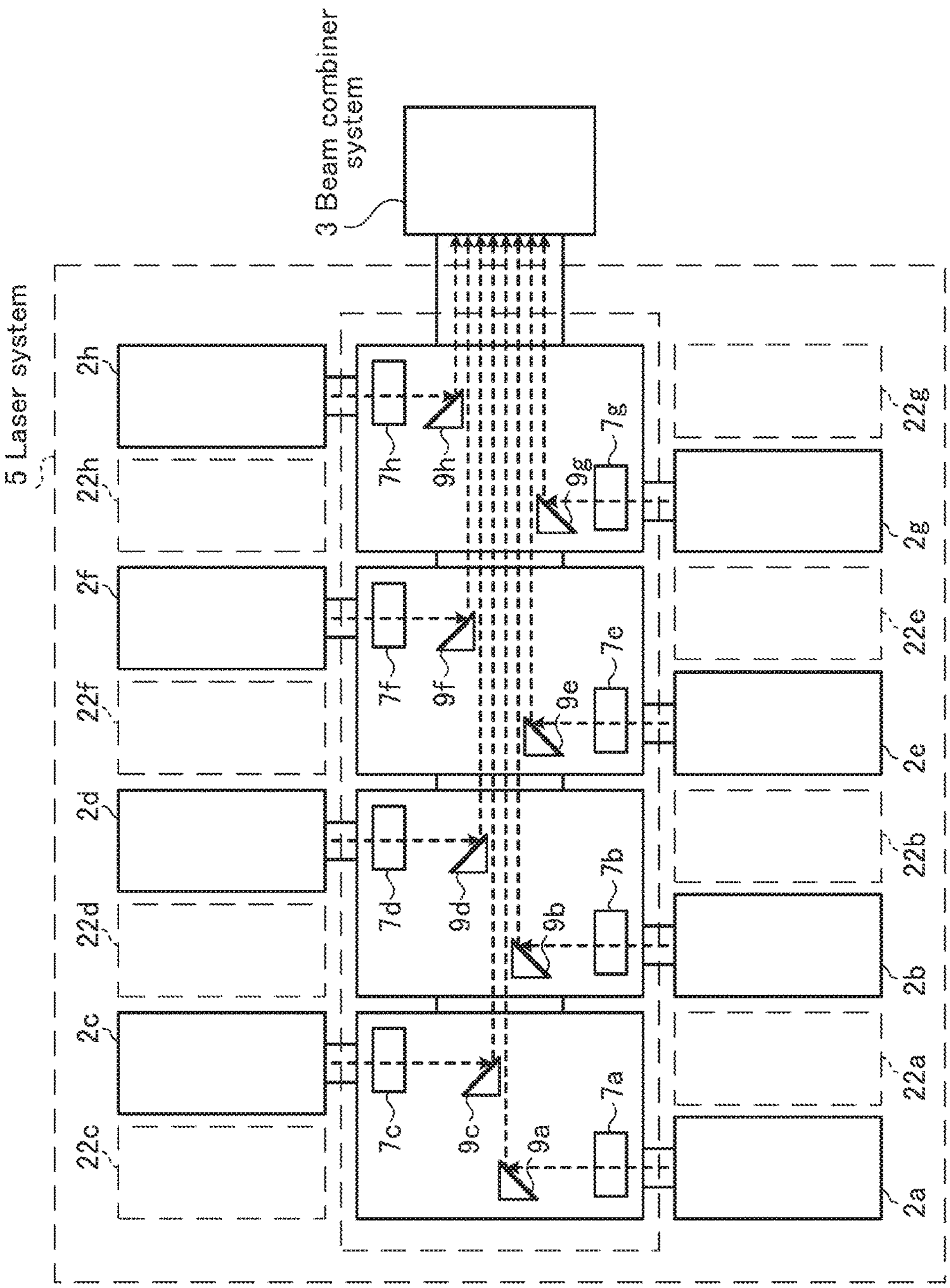
FIG. 5 schematically shows a configuration of a laser system according to a third embodiment of the present disclosure.

FIG. 5 schematically shows a configuration of a laser system according to a third embodiment of the present disclosure. In the laser system 5 of the third embodiment, the first to eighth mirrors 9*a* to 9*h* may be provided in a staggered arrangement. Further, the first to eighth laser apparatuses 2*a* to 2*h* may also be provided in a staggered arrangement. The first and third laser apparatuses 2*a* and 2*c*, the second and fourth laser apparatuses 2*b* and 2*d*, the fifth and sixth laser apparatuses 2*e* and 2*f*, or the seventh and eighth laser apparatuses 2*g* and 2*h* may be shifted from positions opposite to each other.

Thus, for example, the first laser apparatus 2*a* may be provided opposite to the maintenance area 22*c* of the third laser apparatus 2*c*. According to this, an installing space of the laser system 5 including the laser apparatuses 2*a* to 2*h* and the maintenance areas 22*a* to 22*h* may be substantially a rectangular shape, and the installing space of the laser system 5 may be compact.

Figure 6:
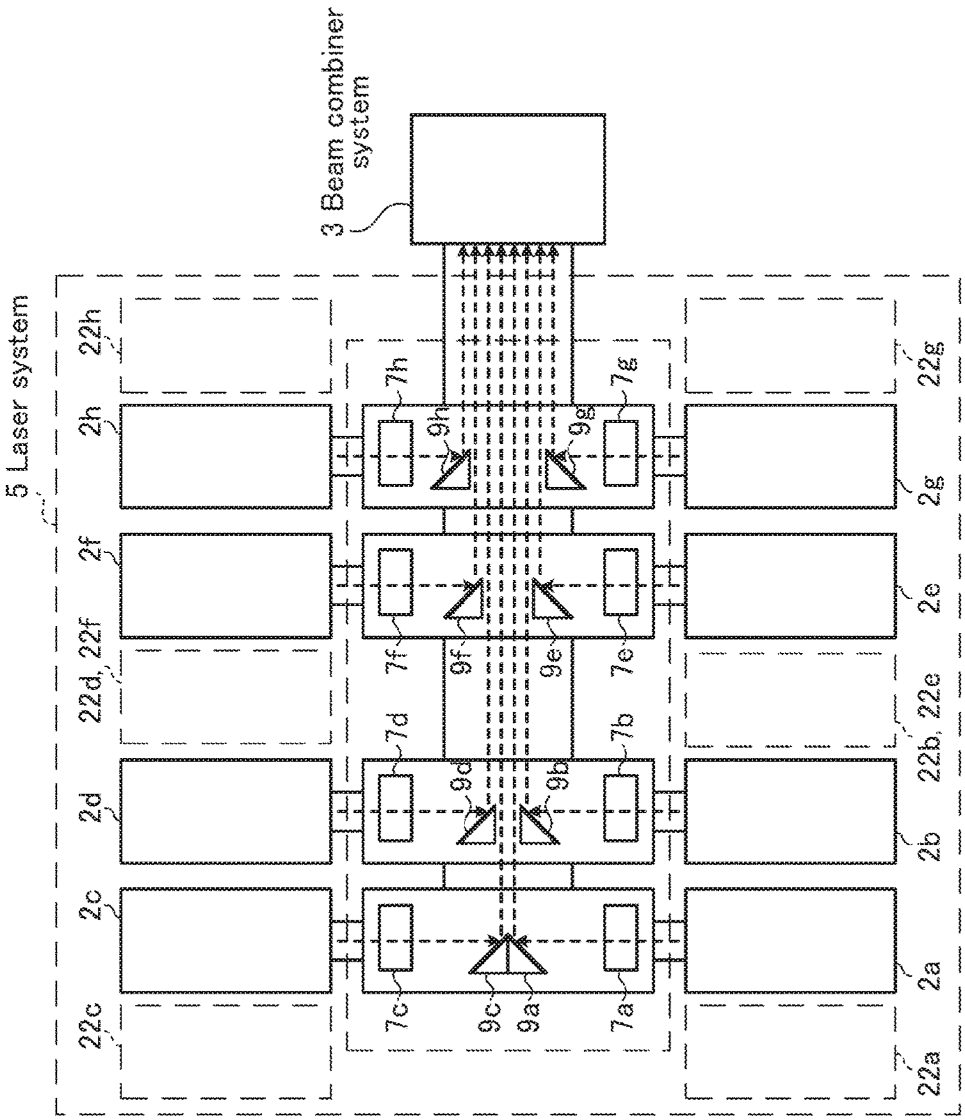
FIG. 6 schematically shows a configuration of a laser system according to a fourth embodiment of the present disclosure.

FIG. 6 schematically shows a configuration of a laser system according to a fourth embodiment of the present disclosure. In the laser system 5 of the fourth embodiment, maintenance areas 22*a*, 22*d*, 22*e*, and 22*h* may be provided for the first, fourth, fifth, and eighth laser apparatuses 2*a*, 2*d*, 2*e*, and 2*h*, respectively, each on a left side with respect to the emitting direction of the pulse laser beam. Maintenance areas 22*b*, 22*c*, 22*f*, and 22*g* may be provided for the second, third, sixth, and seventh laser apparatuses 2*b*, 2*c*, 2*f*, and 2*g*, respectively, each on a right side with respect to the emitting direction of the pulse laser beam.

The maintenance area 22*b* for the second laser apparatus 2*b* and the maintenance area 22*e* for the fifth laser apparatus 2*e* may overlap with each other. Further, the maintenance area 22*d* for the fourth laser apparatus 2*d* and the maintenance area 22*f* for the sixth laser apparatus 2*f* may overlap with each other.

A maintenance area may not be necessary between the first laser apparatus 2*a* and the second laser apparatus 2*b*, or between the third laser apparatus 2*c* and the fourth laser apparatus 2*d*. A maintenance area may not be necessary between the fifth laser apparatus 2*e* and the seventh laser apparatus 2*g*, or between the sixth laser apparatus 2*f* and the eighth laser apparatus 2*h*.

Providing the maintenance area for the first laser apparatus 2*a* on the left side and providing the maintenance area for the second laser apparatus 2*b* on the right side, for example, may reduce distance between these laser apparatuses. Further, providing the maintenance area for the second laser apparatus 2*b* on the right side, and providing the maintenance area for the fifth laser apparatus 2*e* on the left side, for example, these laser apparatuses may share the maintenance area. This may allow the installing space for the laser system 5 to be compact.

Figures 7A, 7B:
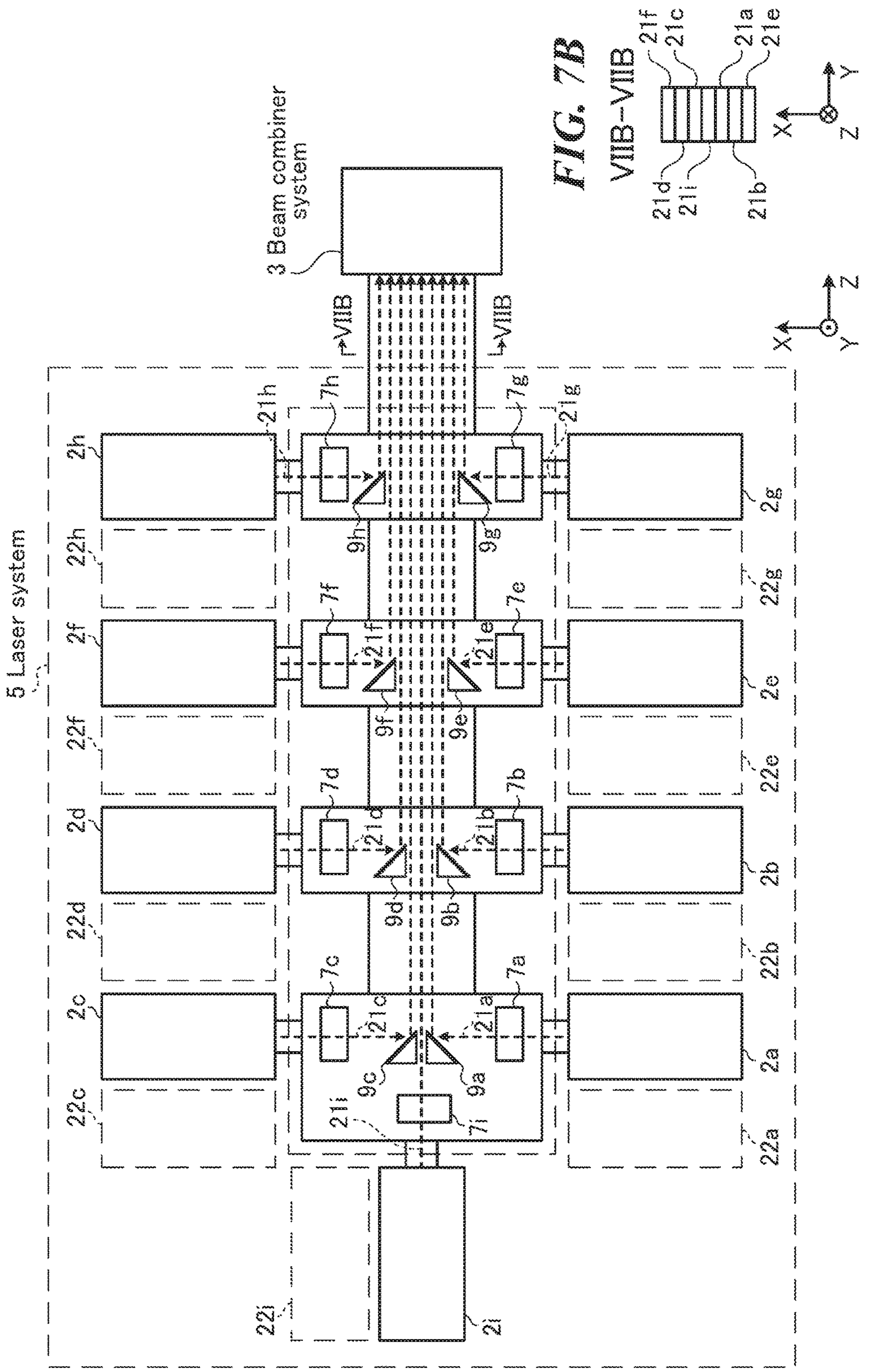
FIG. 7A schematically shows a configuration of a laser system according to a fifth embodiment of the present disclosure.
FIG. 7B shows a cross section of the first to ninth pulse laser beams 21*a* to 21*i* at a line VIIB-VIIB in FIG. 7A.

FIG. 7A schematically shows a configuration of a laser system according to a fifth embodiment of the present disclosure. FIG. 7B shows a cross section of the first to ninth pulse laser beams 21*a* to 21*i* at a line VIIB-VIIB in FIG. 7A. In the laser system 5 of the fifth embodiment, a ninth laser apparatus 2*i* may be provided substantially parallel to the beam delivery direction. The ninth pulse laser beam 21*i* emitted from the ninth laser apparatus 2*i* may pass through a gap between the first mirror 9*a* and the third mirror 9*c* to enter the beam combiner system 3. The first mirror 9*a* and the third mirror 9*c* may have the gap therebetween to allow the ninth pulse laser beam 21*i* to pass therethrough. The beam adjuster 7*i* may be provided in the optical path between an emitting position of the ninth laser apparatus 2*i* and the gap between the first and third mirrors 9*a* and 9*c*.

Figure 8:
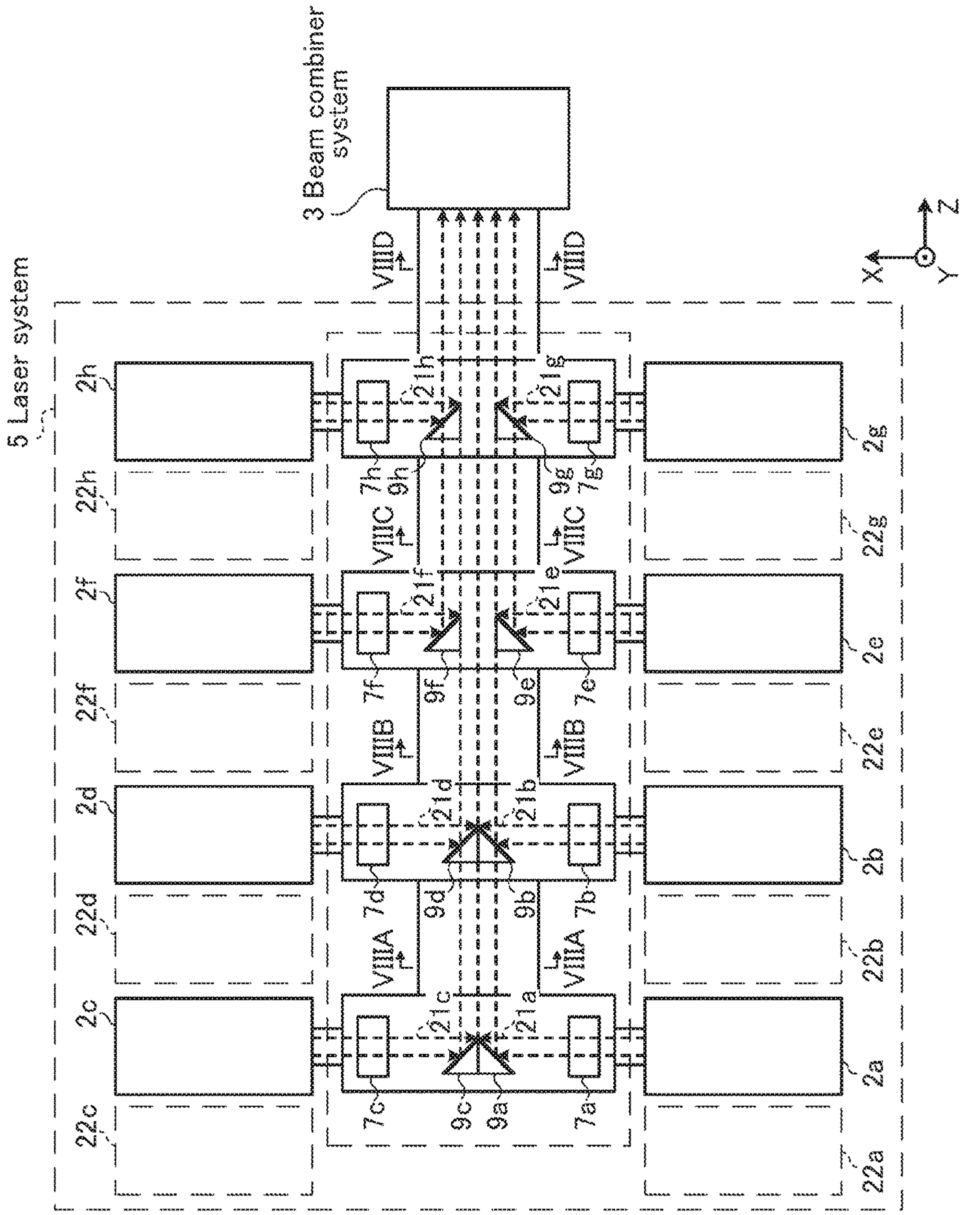
FIG. 8 schematically shows a configuration of a laser system according to a sixth embodiment of the present disclosure.
Figure 8A:
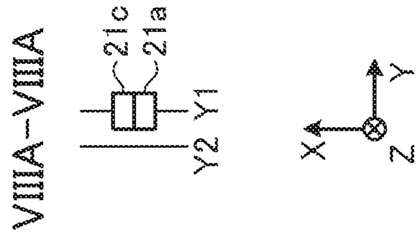
FIGS. 8A to 8D show cross sections of the pulse laser beams at lines VIIIA-VIIIA to VIIID-VIIID, respectively, in FIG. 8.
Figure 8B:
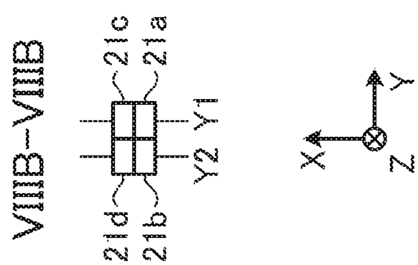
Figure 8C:
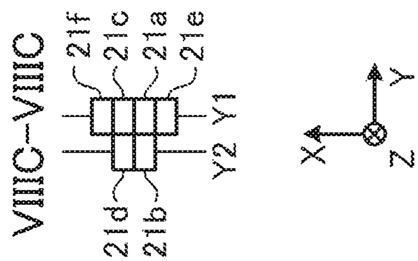
Figure 8D:
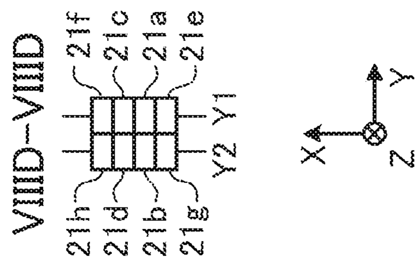

FIG. 8 schematically shows a configuration of a laser system according to a sixth embodiment of the present disclosure. FIGS. 8A to 8D show cross sections of the pulse laser beams at lines VIIIA-VIIIA to VIIID-VIIID, respectively, in FIG. 8. In the laser system 5 of the sixth embodiment, the optical path axes of the first, third, fifth, and sixth pulse laser beams 21*a*, 21*c*, 21*e*, and 21*f* may be positioned in a first plane Y1, and the optical path axes of the second, fourth, seventh, and eighth pulse laser beams 21*b*, 21*d*, 21*g*, and 21*h* may be positioned in a second plane Y2 distanced from the first plane Y1. Both the first plane Y1 and the second plane Y2 may be parallel to the XZ plane.

The first, third, fifth, and sixth mirrors 9*a*, 9*c*, 9*e* and 9*f* may be positioned in the first plane Y1. The second, fourth, seventh, and eighth mirrors 9*b*, 9*d*, 9*g*, and 9*h* may be positioned in the second plane Y2.

The first and third mirrors 9*a* and 9*c* may be provided adjacent to each other. The second and fourth mirrors 9*b* and 9*d* may be provided adjacent to each other. The fifth and sixth mirrors 9*e* and 9*f* may have a first predetermined gap between them. The seventh and eighth mirrors 9*g* and 9*h* may have a gap, which is the same with the first predetermined gap, between them. The first predetermined gap may be a gap where reduction of the pulse laser beams 21*a* and 21*c*, or reduction of the pulse laser beams 21*b* and 21*d* may be suppressed.

The first and third pulse laser beams 21*a* and 21*c* reflected by the first and third mirrors 9*a* and 9*c* may travel along the first plane Y1 to pass through the gap between the fifth and sixth mirrors 9*e* and 9*f*.

The second and fourth pulse laser beams 21*b* and 21*d* reflected by the second and fourth mirrors 9*b* and 9*d* may travel along the second plane Y2 to pass through the gap between the seventh and eighth mirrors 9*g* and 9*h*.

As explained above, the first, third, fifth, and sixth pulse laser beams 21*a*, 21*c*, 21*e*, and 21*f* may be bundled in the first plane Y1, and the second, fourth, seventh, and eighth pulse laser beams 21*b*, 21*d*, 21*g*, and 21*h* may be bundled in the second plane Y2. According to this configuration, many pulse laser beams may be emitted to the exposure apparatus 4.

Assuming that a position of one pulse laser beam of the first to eighth pulse laser beams 21*a* to 21*h* in the XY plane is (Xj, Yj), and that a position of another one pulse laser beam in the XY plane is (Xk, Yk), (Xj, Yj) and (Xk, Yk) may be different from each other. Further, the first to eighth pulse laser beams 21*a* to 21*h* may be arranged in a lattice shape in the XY plane.

Where the pulse laser beams are arranged in the lattice shape, the number of the pulse laser beams arranged in the X direction is Nx, and the number of the pulse laser beams arranged in the Y direction is Ny, the following situation may be preferred. Assuming that the beam width in the X direction of each of the pulse laser beams bundled by the beam delivery device 50 is Ax, the beam width in the Y direction of the same is Ay, and Ax is equal to or shorter than Ay, then Nx may be equal to or more than Ny. If Ax is equal to or longer than Ay, then Nx may be equal to or less than Ny.

5. Laser Apparatus

Figure 9:
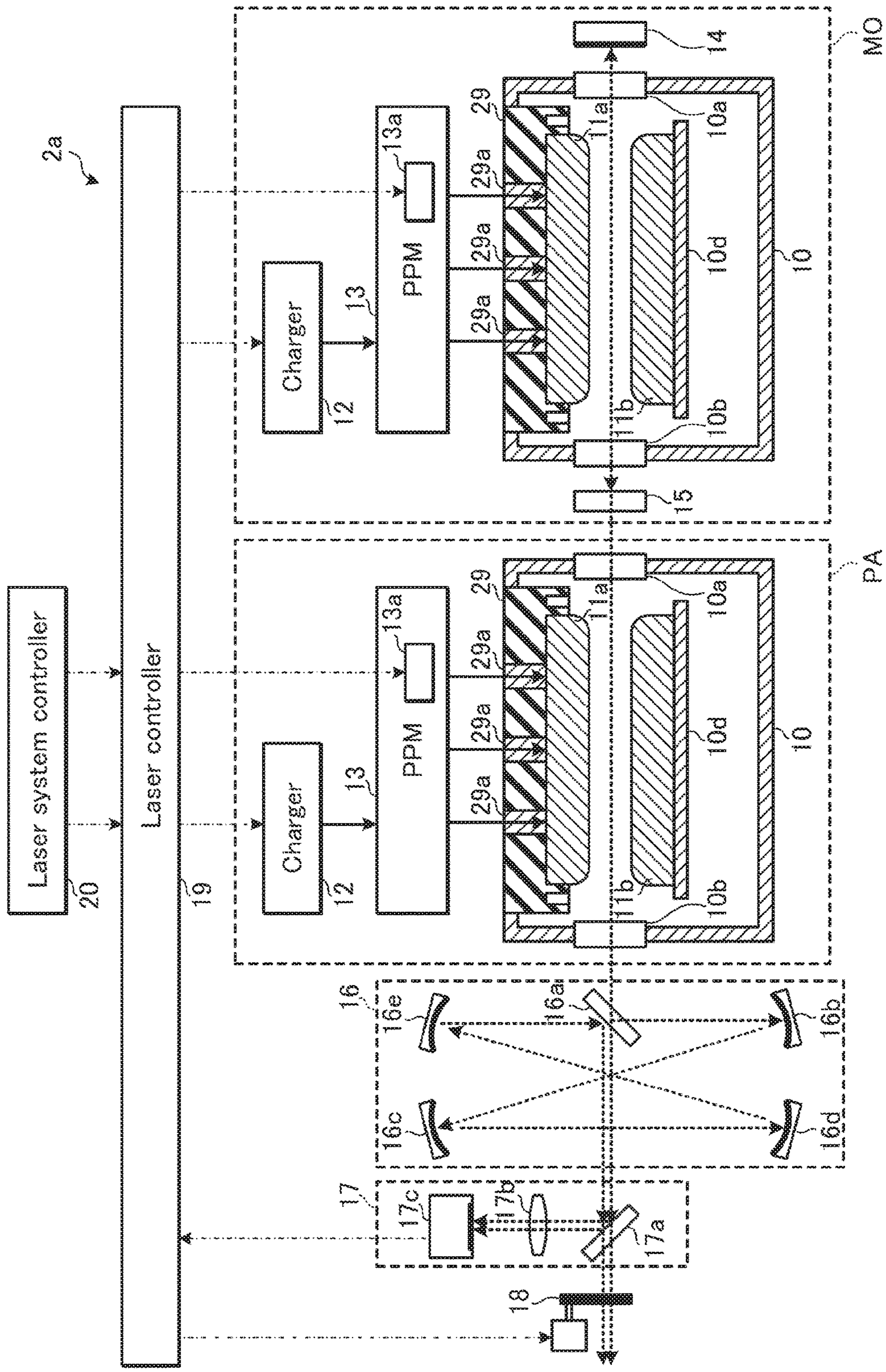
FIG. 9 shows an exemplary configuration of a laser apparatus that can be used in each of the above-mentioned embodiments.

FIG. 9 shows an exemplary configuration of the laser apparatus that can be used in each of the above-mentioned embodiments. The first laser apparatus 2*a* may include a master oscillator MO, a power amplifier PA, a pulse stretcher 16, a pulse energy measuring unit 17, a shutter 18, and a laser controller 19. Configuration of each of the second to fifth laser apparatuses 2*b* to 2*e* may be substantially the same as that of the first laser apparatus 2*a*.

The master oscillator MO may include a laser chamber 10, a pair of electrodes 11*a* and 11*b*, a charger 12, and a pulse power module (PPM) 13. The master oscillator MO may further include a high-reflective mirror 14 and an output coupling mirror 15. FIG. 9 shows an internal configuration of the laser chamber 10 viewed in a direction substantially perpendicular to the travelling direction of the laser beam.

The laser chamber 10 may store laser gases constituting a laser medium, including a rare gas such as argon, krypton or xenon, a buffer gas such as neon or helium, and a halogen gas such as chlorine or fluorine. The pair of electrodes 11*a* and 11*b* may be provided in the laser chamber 10 as electrodes for exciting the laser medium by electric discharge. The laser chamber 10 may have an opening, sealed by an insulating member 29. The electrode 11*a* may be supported by the insulating member 29 and the electrode 11*b* may be supported by a return plate 10*d*. The return plate 10*d* may be electrically connected to an inner surface of the laser chamber 10 through electric wirings (not shown). In the insulating member 29, conductive members 29*a* may be molded. The conductive members 29*a* may apply high-voltage, which is supplied by the pulse power module 13, to the electrode 11*a*.

The charger 12 may be a direct-current power source for charging a charge capacitor (not shown) of the pulse power module 13 at a predetermined voltage. The pulse power module 13 may include a switch 13*a* controlled by the laser controller 19. When the switch 13*a* turns ON, the pulse power module 13 may generate the pulsed high-voltage using electric energy in the charger 12. The high-voltage may be applied to the pair of electrodes 11*a* and 11*b*.

The high-voltage applied to the pair of electrodes 11*a* and 11*b* may cause dielectric breakdown and cause the electric discharge between the pair of electrodes 11*a* and 11*b*. Energy of the electric discharge may excite the laser medium in the laser chamber 10 to a high energy level. The excited laser medium may then change to a low energy level, where the laser medium generates light according to the difference of the energy levels.

The laser chamber 10 may have windows 10*a* and 10*b* at respective ends of the laser chamber 10. The light generated in the laser chamber 10 may be emitted from the laser chamber 10 through the windows 10*a* and 10*b*.

The high-reflective mirror 14 may reflect the light emitted from the window 10*a* of the laser chamber 10 at high reflectance to return the light to the laser chamber 10.

The output coupling mirror 15 may transmit to output a part of the light emitted from the window 10*b* of the laser chamber 10 and reflect to return another part of the light to the laser chamber 10.

The high-reflective mirror 14 and the output coupling mirror 15 may thus constitute an optical resonator. The light emitted from the laser chamber 10 may travel back and forth between the high-reflective mirror 14 and the output coupling mirror 15. The light may be amplified at every time to pass a laser gain region between the electrode 11*a* and the electrode 11*b*. The pulse laser beam of the amplified light may be emitted through the output coupling mirror 15.

The power amplifier PA may be provided in the optical path of the pulse laser beam emitted from the output coupling mirror 15 of the master oscillator MO. The power amplifier PA may include, as in the master oscillator MO, a laser chamber 10, a pair of electrodes 11*a* and 11*b*, a charger 12, and a pulse power module (PPM) 13. Configurations of these elements may be substantially the same as those in the master oscillator MO. The power amplifier PA does not have to include the high-reflective mirror 14 or the output coupling mirror 15. The pulse laser beam, which entered the power amplifier PA through the window 10*a*, may once pass the laser gain region between the electrode 11*a* and the electrode 11*b*, and then be emitted through the window 10*b*.

The pulse stretcher 16 may be provided in the optical path of the pulse laser beam emitted from the window 10*b* of the power amplifier PA. The pulse stretcher 16 may include a beam splitter 16*a*, and first to fourth concave mirrors 16*b* to 16*e*.

The pulse laser beam emitted from the power amplifier PA may be incident on a first surface of the beam splitter 16*a* from the right side in FIG. 9. The beam splitter 16*a* may include a $CaF_2$ substrate transmitting the pulse laser beam at high transmittance. The $CaF_2$ substrate may be coated with a high-transmitting film on the first surface and coated with a partially-reflective film on a second surface opposite to the first surface. A part of the pulse laser beam incident on the beam splitter 16*a* from the right side of FIG. 9 may be transmitted by the beam splitter 16*a*. Another part of the pulse laser beam may be reflected by the second surface and emitted from the beam splitter 16*a*.

The first to fourth concave mirrors 16*b* to 16*e* may sequentially reflect the pulse laser beam reflected by the beam splitter 16*a*. The pulse laser beam sequentially reflected by the first to fourth concave mirrors 16*b* to 16*e* may be incident on the second surface of the beam splitter 16*a* from the upper side in FIG. 9. The first to fourth concave mirrors 16*b* to 16*e* may be arranged such that the pulse laser beam incident on the beam splitter 16*a* from the right side in FIG. 9 and reflected by the beam splitter may be transferred to the second surface of the beam splitter 16*a* by the first to fourth concave mirrors 16*b* to 16*e* at 1:1. The beam splitter 16*a* may reflect at least a part of the pulse laser beam incident from the upper side in FIG. 9. The pulse laser beam incident on the beam splitter 16*a* from the right side in FIG. 9 and transferred by the beam splitter 16*a* and the pulse laser beam incident on the beam splitter 16*a* from the upper side in FIG. 9 and reflected by the beam splitter 16*a* may thus be combined in substantially the same beam sizes and in substantially the same beam divergences.

The pulse laser beam which was incident on the beam splitter 16*a* from the right side in FIG. 9 and was transferred by the beam splitter 16*a* and the pulse laser beam which was incident on the beam splitter 16*a* from the upper side in FIG. 9 and was reflected by the beam splitter 16*a* may have a time difference according to the optical path length of the detour path formed by the first to fourth concave mirrors 16*b* to 16*e*. The pulse stretcher 16 may thus stretch the pulse width of the pulse laser beam.

The pulse energy measuring unit 17 may be provided in the optical path of the pulse laser beam emitted from the pulse stretcher 16. The pulse energy measuring unit 17 may include a beam splitter 17*a*, focusing optics 17*b*, and an optical sensor 17*c*.

The beam splitter 17*a* may transmit a part of the pulse laser beam, emitted from the pulse stretcher 16, at high transmittance to the shutter 18. The beam splitter 17*a* may reflect another part of the pulse laser beam to the focusing optics 17*b*. The focusing optics 17*b* may concentrate the light reflected by the beam splitter 17*a* on a light-receiving surface of the optical sensor 17*c*. The optical sensor 17*c* may detect pulse energy of the pulse laser beam concentrated on the light-receiving surface and output data on the pulse energy to the laser controller 19.

The laser controller 19 may send and receive various signals to and from the laser system controller 20. For example, the laser controller 19 may receive a first trigger signal or data on the target pulse energy from the laser system controller 20. Further, the laser controller 19 may send a setting signal to set the charging voltage to the charger 12 and send an instruction signal for ON/OFF of the switch to the pulse power module 13.

The laser controller 19 may receive the data on the pulse energy from the pulse energy measuring unit 17 and control the charging voltage of the charger 12 in reference to the data on the pulse energy. Controlling the charging voltage of the charger 12 may result in controlling the pulse energy of the laser beam.

Further, the laser controller 19 may correct timing of an oscillation trigger such that the discharge occurs at a predetermined timing from the oscillation trigger based on the charging voltage.

The shutter 18 may be provided in the optical path of the pulse laser beam transmitted by the beam splitter 17*a* of the pulse energy measuring unit 17. The laser controller 19 may control the shutter 18 to be closed, from starting laser oscillation, until difference between the pulse energy received from the pulse energy measuring unit 17 and the target pulse energy falls within an acceptable range. The laser controller 19 may control the shutter 18 to be opened if the difference between the pulse energy received from the pulse energy measuring unit 17 and the target pulse energy falls within the acceptable range. The signal to indicate the pulse energy may be sent to the laser system controller 20 to show the timing of the pulse laser beam 21.

FIG. 9 shows an example where the laser apparatus includes the power amplifier PA and the pulse stretcher 16; however, the power amplifier PA or the pulse stretcher 16 may be omitted.

Further, the laser apparatus does not have to be limited to the excimer laser apparatus. The laser apparatus may be a solid laser apparatus. For example, the solid laser apparatus may be a YAG laser apparatus to generate a third harmonic light having wavelength of 355 nm or a fourth harmonic light having wavelength of 266 nm.

6. Optical Path Length Adjuster

Each of the beam adjusters 7*a* to 7*e* used in the above embodiments may include an optical path length adjuster 71.

For example, the optical path length adjuster 71 may make the first pulse laser beam 21*a* detour to change the optical path length of the first pulse laser beam 21*a*. The optical path length adjuster 71 may change the optical path length of the first pulse laser beam 21*a* under control by the beam delivery device controller 59.

Figure 10:
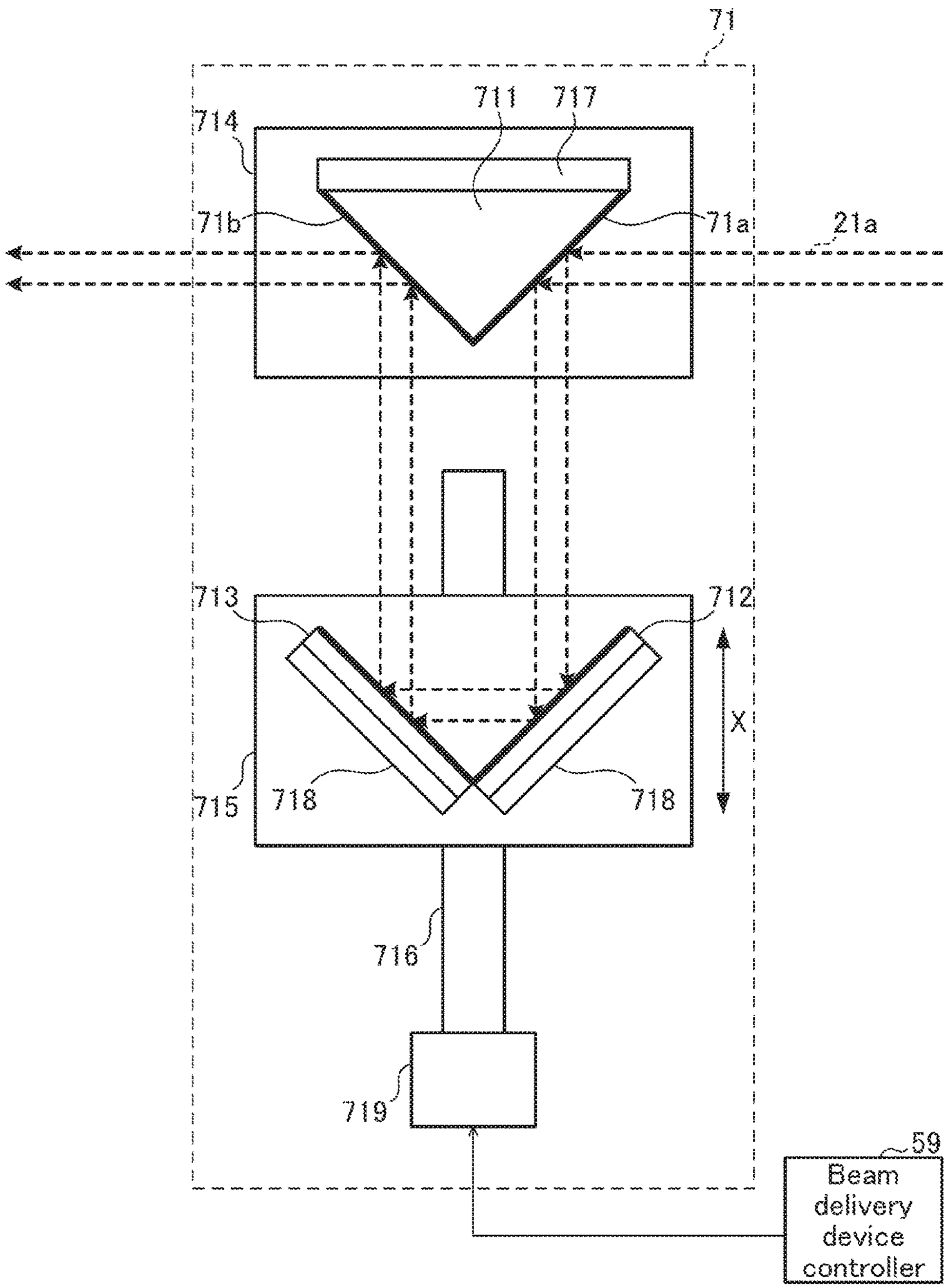
FIG. 10 schematically shows a configuration of an optical path length adjuster 71.

FIG. 10 schematically shows a configuration of an optical path length adjuster 71. The optical path length adjuster 71 may include a right-angle prism 711, two high-reflective mirrors 712 and 713, plates 714 and 715, and a uniaxial stage 716.

The right-angle prism 711 may have a first surface 71*a* and a second surface 71*b* perpendicular to each other, each of which may be coated with a high-reflective film. The right-angle prism 711 may be held by a holder 717. The holder 717 may be fixed to the plate 714. The right-angle prism 711 may be provided in the optical path of the first pulse laser beam 21*a*.

The two high-reflective mirrors 712 and 713 may be held by a holder 718 such that their reflective surfaces are perpendicular to each other. The holder 718 may be fixed to the plate 715. The plate 715 may be fixed to the uniaxial stage 716. The uniaxial stage 716 may be configured to move the two high-reflective mirrors 712 and 713 in a direction substantially parallel to the optical path axis of the first pulse laser beam 21*a* reflected by the first surface 71*a* of the right-angle prism 711.

The first pulse laser beam 21*a* reflected by the first surface 71*a* of the right-angle prism 711 may be reflected by the two high-reflective mirrors 712 and 713 and then be made incident on the second surface 71*b* of the right-angle prism 711. The first pulse laser beam 21*a* incident on the second surface 71*b* of the right-angle prism 711 may emit from the second surface 71*b* of the right-angle prism 711 along an extension line of the optical path axis of the first pulse laser beam 21*a* incident on the first surface 71*a* of the right-angle prism 711.

The beam delivery device controller 59 may drive a motor 713 of the uniaxial stage 716 to move the two high-reflective mirrors 712 and 713. Moving the two high-reflective mirrors 712 and 713 by a distance X may cause the optical path length of the first pulse laser beam 21*a* to be changed by 2X. By changing the optical path length, beam size or the optical path length of the first pulse laser beam 21*a* may be changed. The optical path length adjusters may control the respective optical path lengths from the corresponding laser apparatus to the emitting position of the laser system 5 to be substantially the same with each other.

7. Beam Divergence Adjuster

Each of the beam adjusters 7*a* to 7*e* in the above embodiments may include beam divergence adjusters 72.

The beam divergence adjuster 72 may be configured to change, for example, the beans divergence of the first pulse laser beam 21*a*. The beam divergence adjuster 72 may change the beam divergence of the first pulse laser beam 21*a* under control by the beam delivery device controller 59.

Figure 11A:
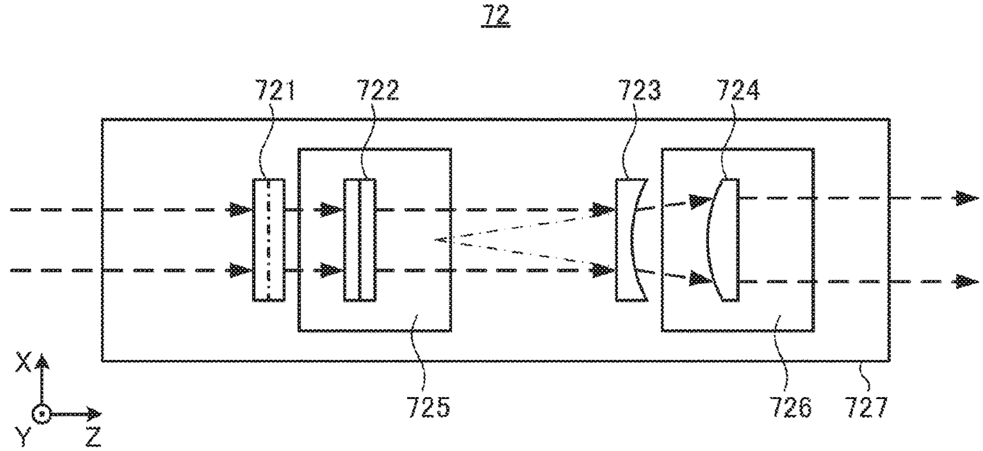
FIGS. 11A and 11B schematically show a configuration of a beam divergence adjuster 72.
Figure 11B:
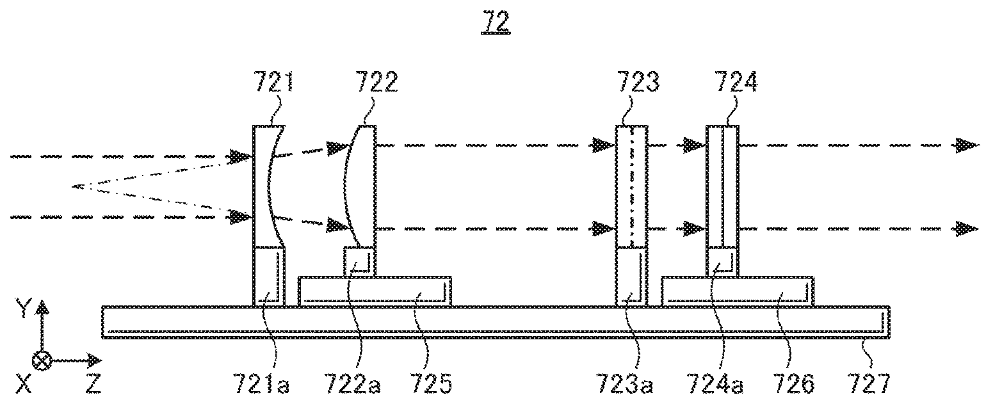

FIGS. 11A and 11B schematically show a configuration of a beam divergence adjuster 72. FIG. 11A is a plan view, and FIG. 11B is a side view. The beam divergence adjuster 72 may include a first cylindrical concave lens 721, a first cylindrical convex lens 722, a second cylindrical concave lens 723, and a second cylindrical convex lens 724.

The first cylindrical concave lens 721 may be held by a holder 721*a* on a plate 727. The first cylindrical convex lens 722 may be held by a holder 722*a* on a uniaxial stage 725. The second cylindrical concave lens 723 may be held by a holder 723*a* on the plate 727. The second cylindrical convex lens 724 may be held by a holder 724*a* on a uniaxial stage 726. The uniaxial stage 725 may move the first cylindrical convex lens 722 along the optical path axis of the first pulse laser beam 21*a*. The uniaxial stage 726 may move the second cylindrical convex lens 724 along the optical path axis of the first pulse laser beam 21*a*.

The concave surface of the first cylindrical concave lens 721 and the convex surface of the first cylindrical convex lens 722 may be cylindrical surfaces each having a central axis substantially parallel to the X direction. The first cylindrical concave lens 721 and the first cylindrical convex lens 722 may thus expand or reduce the beam width in the Y direction.

A focal position of the first cylindrical concave lens 721 and a focal position of the first cylindrical convex lens 722 may coincide with each other, and focal lengths of these lenses may be not so far from each other. In that case, the beam divergence adjuster 72 may suppress change in beam divergence of the first pulse laser beam 21*a* in the Y direction. The uniaxial stage 725 may move the first cylindrical convex lens 722 along the optical path axis of the first pulse laser beam 21*a*, such that the focal position of the first cylindrical concave lens 721 separates from the focal position of the first cylindrical convex lens 722. When the focal position of the first cylindrical concave lens 721 is separate from the focal position of the first cylindrical convex lens 722, the beam divergence adjuster 72 may change the beam divergence of the pulse laser beam 21*a* in the Y direction.

The concave surface of the second cylindrical concave lens 723 and the convex surface of the second cylindrical convex lens 724 may be cylindrical surfaces each having a central axis substantially parallel to the Y direction. The second cylindrical concave lens 723 and the second cylindrical convex lens 724 may thus expand or reduce the beam width in the X direction.

A focal position of the second cylindrical concave lens 723 and a focal position of the second cylindrical convex lens 724 may coincide with each other, and focal lengths of these lenses may not be so far from each other. In that case, the beam divergence adjuster 72 may suppress change in beam divergence of the first pulse laser beam 21*a* in the X direction. The uniaxial stage 726 may move the second cylindrical convex lens 724 along the optical path axis of the first pulse laser beam 21*a* such that the focal position of the second cylindrical concave lens 723 separates from the focal position of the second cylindrical convex lens 724. When the focal position of the second cylindrical concave lens 723 is separate from the focal position of the second cylindrical convex lens 724, the beam divergence adjuster 72 may change the beam divergence of the pulse laser beam 21*a* in the X direction.

According to this beam divergence adjuster 72, the beam divergence in the Y direction and the beam divergence in the X direction are independently controlled.

8. Mirror-Moving Mechanism

Figure 12A:
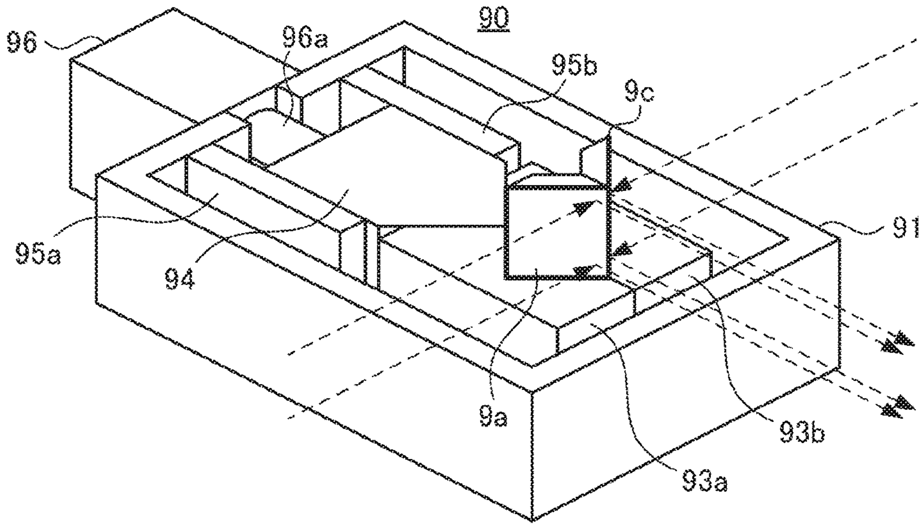
FIGS. 12A to 12C show a mirror-moving mechanism for changing a gap between first and third mirrors 9*a* and 9*c* shown in FIG. 2A.
Figure 12B:
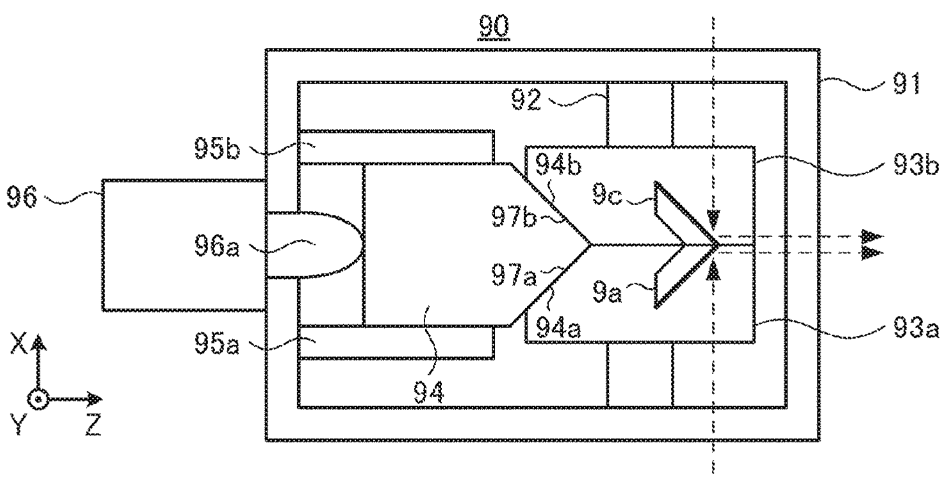
Figure 12C:
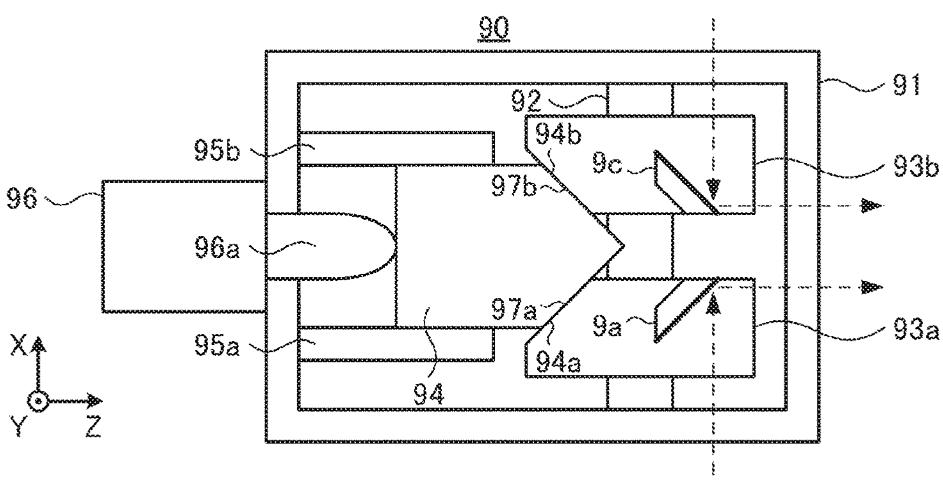

FIGS. 12A to 12C show a mirror-moving mechanism for changing the gap between the first and third mirrors 9*a* and 9*c* shown in FIG. 2A. FIG. 12A is a perspective view, FIG. 12B is a plan view where the gap between the mirrors is narrow, and FIG. 12C is another plan view where the gap between the mirrors is enlarged.

The gap between the first and third mirrors 9*a* and 9*c* may thus be adjusted by the mirror-moving mechanism 90. The gap between the second and fourth mirrors 9*b* and 9*d*, the gap between the fifth and sixth mirrors 9*e* and 9*f*, the gap between the seventh and eighth mirrors 9*g* and 9*h* may also be adjusted.

The mirror-moving mechanism 90 may include a casing 91, a linear guide 92, mirror holders 93*a* and 93*b*, a wedge-shaped plate 94, wedge guides 95*a* and 95*b*, and an automatic micrometer 96. The casing 91 may store the linear guide 92, the mirror holders 93*a* and 93*b*, the wedge-shaped plate 94, and the wedge guides 95*a* and 95*b*.

The wedge guides 95*a* and 95*b* may be provided such that their longitudinal directions are substantially parallel to each other to coincide with the Z direction. The wedge-shaped plate 94 may have a substantially pentagonal shape in the plan view, and have a first sliding surface 94*a* and a second sliding surface 94*b* both on a side of the Z direction. The wedge-shaped plate 94 may be provided between the wedge guides 95*a* and 95*b* so as to move in the Z direction. The automatic micrometer 96 may be attached to the casing 91. A movable element 96*a* of the automatic micrometer 96 may be capable of pushing the wedge-shaped plate 94 in the Z direction.

The linear guide 92 may be provided such that its longitudinal direction substantially coincides with the X direction. The mirror holders 93*a* and 93*b* may hold the first and third mirrors 9*a* and 9*c*, respectively. The mirror holder 93*a* may have a third sliding surface 97*a*, contacting with the first sliding surface 94*a* of the wedge-shaped plate 94, on a side of a −Z direction. The mirror holder 93*b* may have a fourth sliding surface 97*b*, contacting with the second sliding surface 94*b* of the wedge-shaped plate 94, on a side of the −Z direction. Each of the mirror holders 93*a* and 93*b* may be attached to the linear guide 92 so as to move along the longitudinal direction of the linear guide 92. The mirror holders 93*a* and 93*b* may be forced to get close to each other by some springs (not shown).

Upon the movable element 96*a* being drawn out by the automatic micrometer 96 according to a driving signal outputted by the beam delivery device controller 59, the wedge-shaped plate 94 may move to the Z direction. The first sliding surface 94*a* and the second sliding surface 94*b* of the wedge-shaped plate 94 may push the third sliding surface 97*a* of the mirror holder 93*a* and the fourth sliding surface 97*b* of the mirror holder 93*b*, respectively. The mirror holders 93*a* and 93*b* may thus be moved in the −X and X directions, respectively, and the gap between the first and third mirrors 9*a* and 9*c* may be expanded. Here, moving distances of the mirror holders 93*a* and 93*b* in the −X and the X directions may be substantially equal to each other.

Upon the movable element 96*a* being drawn back by the automatic micrometer 96, the mirror holders 93*a* and 93*b* may be pushed by the springs (not shown), and thus the gap between the first and third mirrors 9*a* and 9*c* may be reduced.

Here, a single automatic micrometer 96 may move the two mirror holders 93*a* and 93*b*; however, the present disclosure is not limited to this. Two moving mechanisms operated independently from each other may move the two mirror holders 93*a* and 93*b*.

9. Beam Combiner Including Fly Eye Lens

Figure 13:
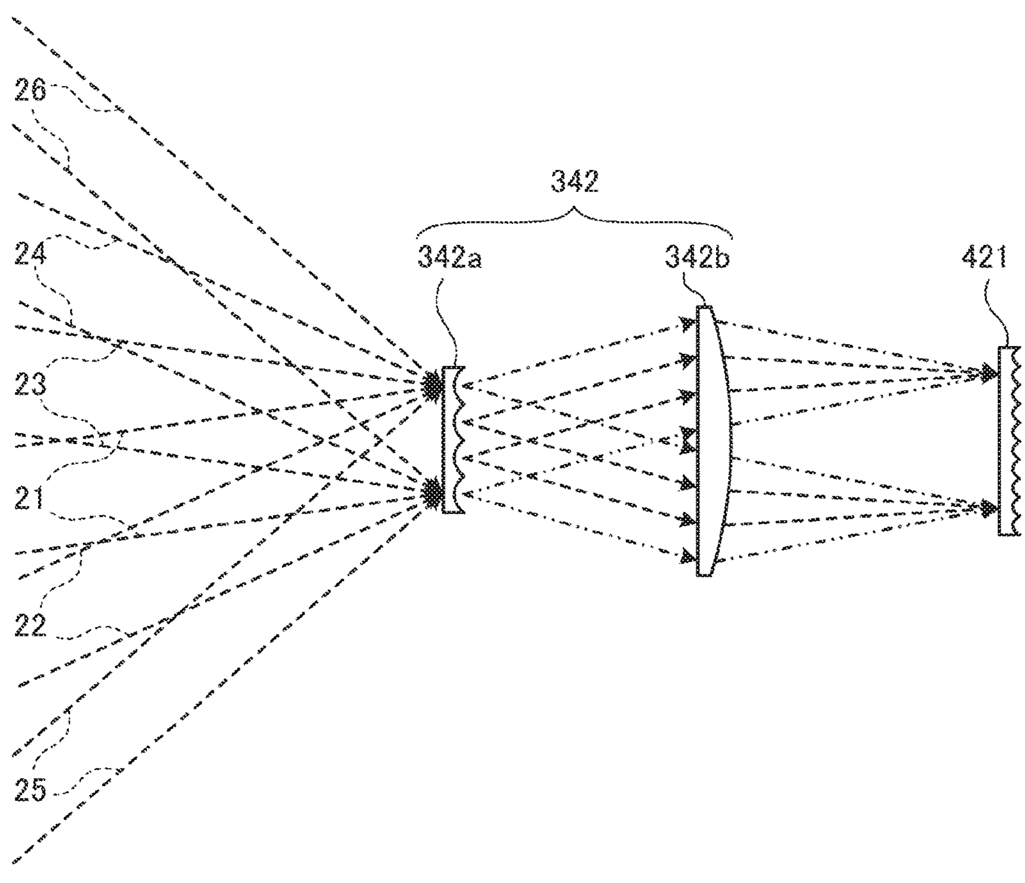
FIG. 13 shows an exemplary beam combiner that can be used in each of the above embodiments.

FIG. 13 shows an exemplary beam combiner that can be used in each of the above embodiments. In FIG. 13, illustration of the high-reflective mirror 41 in the exposure apparatus 4 is omitted. Instead of the beam combiner 34 using the diffractive optical element shown in FIG. 1, a beam combiner 342 including a fly eye lens 342*a* and condenser optics 342*b* may be used.

The fly eye lens 342*a* may be constituted by an ultraviolet-transmitting substrate, such as a synthetic quartz substrate or a calcium fluoride substrate, on which multiple concave or convex lenses are formed. The fly eye lens 342*a* may be provided at the position where the first to sixth pulse laser beams 21 to 26 emitted from the incident optics 33 overlap with each other. The lenses included in the fly eye lens 342*a* may be arranged in the cross section of a plurality of pulse laser beams including the first to sixth pulse laser beams 21 to 26. The lenses may transmit respective parts of the plurality of pulse laser beams toward the condenser optics 342*b* and expand beam widths of the respective parts. The fly eye lens 342*a* may thus form multiple point light sources as secondary light sources using the pulse laser beams. The fly eye lens 342*a* may include a set of cylindrical concave or convex lenses arranged in one direction and another set of cylindrical concave or convex lenses arranged in another direction perpendicular to the one direction.

The condenser optics 342*b* may include at least one convex lens. The condenser optics 342*b* may extend over the optical paths of the respective parts of the plurality of pulse laser beams expanded by the respective lenses of the fly eye lens 342*a*.

The fly eye lens 342*a* may be provided such that a front-side focal plane of the condenser optics 342*b* substantially coincides with respective focal positions of the fly eye lens 342*a*. The condenser optics 342*b* may thus collimate each of the parts of the plurality of pulse laser beams expanded by the respective lenses of the fly eye lens 342*a*, such that each of the parts has substantially parallel rays.

The condenser optics 342*b* may be provided such that a rear-side focal plane of the condenser optics 342*b* substantially coincides with a light-receiving surface of the fly eye lens 421 of the exposure apparatus 4. The condenser optics 342*b* may thus make the respective parts, expanded by the respective lenses of the fly eye lens 342*a*, enter substantially the same portion of the fly eye lens.

Consequently, the pulse laser beam in which the parts are overlapping with each other at the light-receiving surface of the fly eye lens 421 of the exposure apparatus 4 may have small variation in light intensity distribution in a cross section of the pulse laser beam.

10. Beam Parameter Measuring Device

Figure 14:
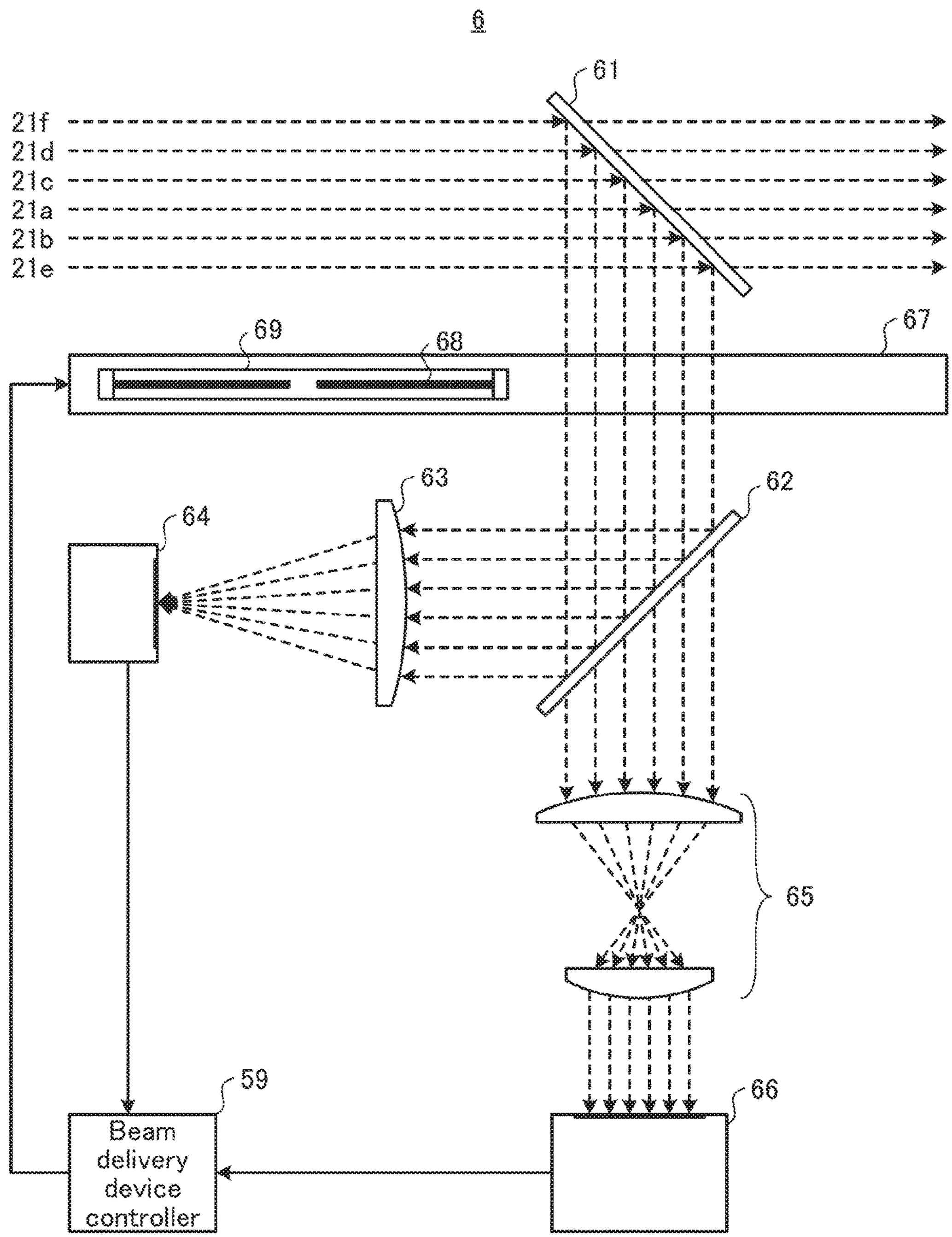
FIG. 14 shows a specific configuration of a beam parameter measuring device 6 that can be used in each of the above embodiments.

FIG. 14 shows a specific configuration of a beam parameter measuring device 6 that can be used in each of the above embodiments.

The beam parameter measuring device 6 may include a first beam splitter 61, a second beam splitter 62, focusing optics 63, a first image sensor 64, transfer optics 65, a second image sensor 66, and a beam selecting mechanism 67.

The beam splitter 61 may be provided at a light-emitting position of the beam delivery device 50. The beam splitter 61 may transmit a part of the bundled laser beam, bundled by the beam delivery device 50, at high transmittance to a first direction. The beam splitter 61 may reflect another part of the bundled laser beam to a second direction.

The beam selecting mechanism 67 may include a slit plate 68 and a moving mechanism 69. The beam selecting mechanism 67 may extend over a cross section of the optical path of the bundled laser beam reflected by the beam splitter 61 to the second direction. The moving mechanism 69 may move the slit plate 68 across the optical path axis of the bundled laser beam. The slit plate 68 may have a slit through which a single pulse laser beam of the first to sixth pulse laser beams 21*a* to 21*f* included in the bundled laser beam may pass. The moving mechanism 69 may control the position of the slit plate 68 such that a selected single pulse laser beam may pass through the beam selecting mechanism 67.

The beam splitter 62 may be provided in the optical path of the bundled laser beam or the individual pulse laser beam reflected by the beam splitter 61 to the second direction. The beam splitter 62 may transmit a part of the bundled laser beam or the individual pulse laser beam to the transfer optics 65, and reflect another part to the focusing optics 63.

The transfer optics 65 may transfer an image of the bundled laser beam, transmitted by the beam splitter 62, to a light-receiving surface of the second image sensor 66.

The second image sensor 66 may output data on distribution of light intensity of the bundled laser beam, transferred by the transfer optics 65, to the beam delivery device controller 59.

The beam delivery device controller 59 may calculate a centroid of the distribution of the light intensity, based on the data on the distribution of the light intensity outputted from the second image sensor 66, as a beam position of the bundled laser beam or the individual pulse laser beam.

The beam delivery device controller 59 may calculate beam size in the cross section of the bundled laser beam or the individual pulse laser beam. The beam size may be calculated based on the data, outputted from the second image sensor 66, on the distribution of the light intensity. The beam size in the cross section may be width of a portion having light intensity corresponding to $1/e^2$ or more of the peak intensity. In the excimer laser, beam sizes in the X direction and the Y direction may be different from each other. These beam sizes may be calculated based on the respective distributions of light intensity in the X direction and the Y direction.

The first image sensor may be provided in a focal plane of the focusing optics 63.

The focusing optics 63 may concentrate the bundled laser beam or the individual pulse laser beam, reflected by the beam splitter 62, to a light-receiving surface of the first image sensor 64.

The first image sensor 64 may receive the bundled laser beam or the individual pulse laser beam concentrated by the focusing optics 63. The first image sensor 64 may output data on distribution of light intensity of the bundled laser beam or the individual pulse laser beam at a light-concentration position to the beam delivery device controller 59.

The beam delivery device controller 59 may calculate a centroid of the distribution of the light intensity based on the data on the distribution of the light intensity outputted from the first image sensor 64. The beam delivery device controller 59 may divide the position of the centroid by the focal length of the focusing optics 63 to calculate travelling direction of the bundled laser beam or the individual pulse laser beam.

The beam delivery device controller 59 may calculate beam size in the cross section based on data on the distribution of light intensity outputted from the first image sensor 64. The beam delivery device controller 59 may divide the beam size in the cross section by the focal length of the focusing optics 63 to calculate beam divergence of the bundled laser beam or the individual pulse laser beam. In the excimer laser, beam divergences in the X direction and the Y direction may be different from each other. These beam divergences may be calculated based on the respective distributions of light intensity in the X direction and the Y direction.

11. Controller

Figure 15:
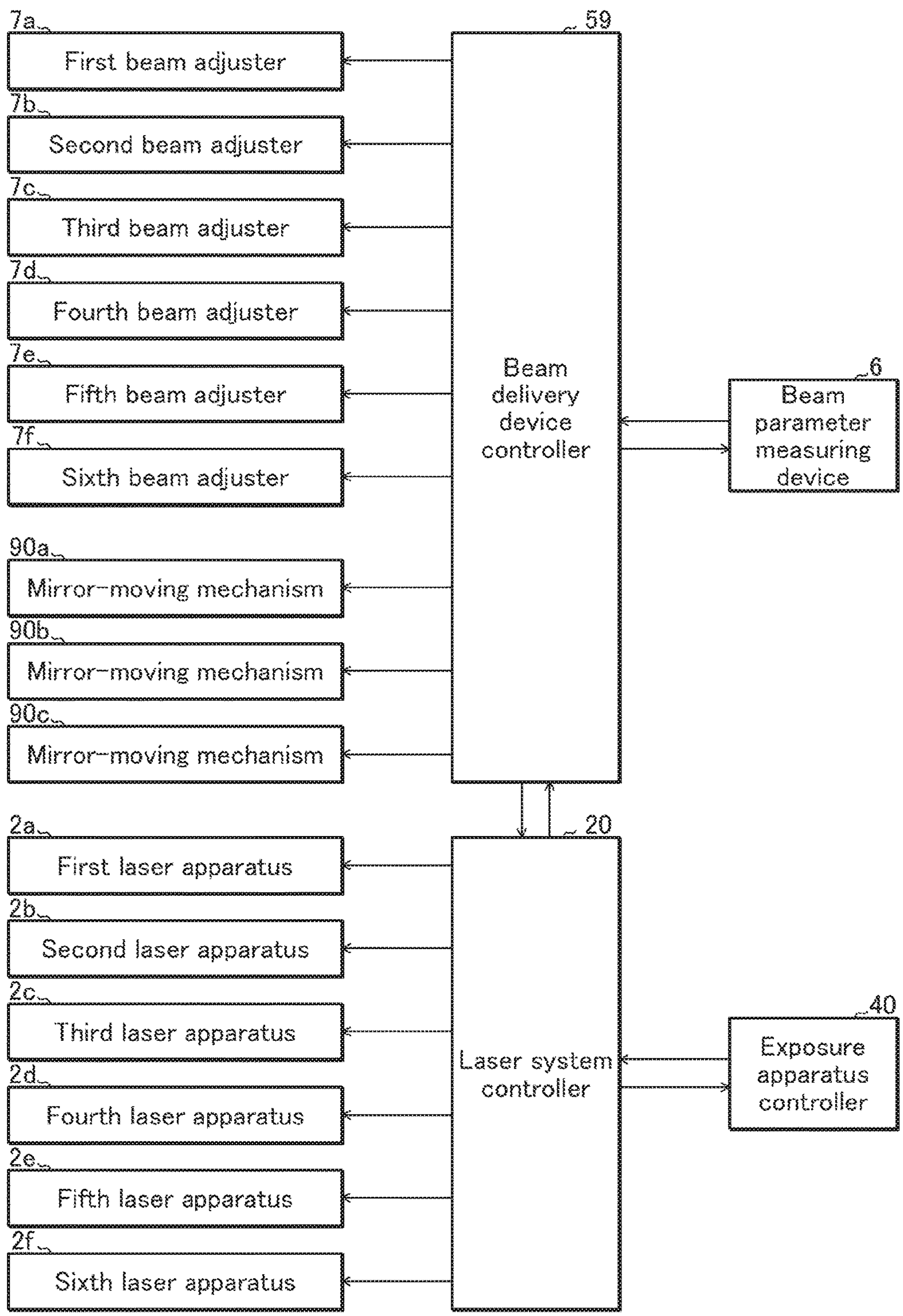
FIG. 15 is a block diagram of a laser system controller 20, a beam delivery device controller 59, and their peripheries shown in FIG. 2A.

FIG. 15 is a block diagram of a laser system controller 20, a beam delivery device controller 59, and their peripheries shown in FIG. 2A.

An exposure apparatus controller 40 included in the exposure apparatus 4 may perform moving a stage (not shown), which holds the irradiation object P, exchanging the irradiation object P, or exchanging the mask 43. The exposure apparatus controller 40 may output an oscillation trigger signal to the laser system controller 20.

The laser system controller 20 may receive the oscillation trigger signal from the exposure apparatus controller 40 in the exposure apparatus 4 and send trigger signals to the laser apparatuses 2*a* to 2*f*. The laser apparatuses 2*a* to 2*f* may emit the pulse laser beams based on the respective trigger signals received from the laser system controller 20.

The beam delivery device controller 59 may calculate the beam parameters of the first to sixth pulse laser beams 21*a* to 21*f* based on the data received from the beam parameter measuring device 6. The beam delivery device controller 59 may control the beam adjusters 7*a* to 7*f* based on the calculated beam parameters. The beam delivery device controller 59 may control the plurality of mirror-moving mechanisms 90 based on the calculated beam parameters. The plurality of mirror-moving mechanisms 90 may include first to third mirror-moving mechanisms 90*a* to 90*c*.

12. Operation

Figure 16:
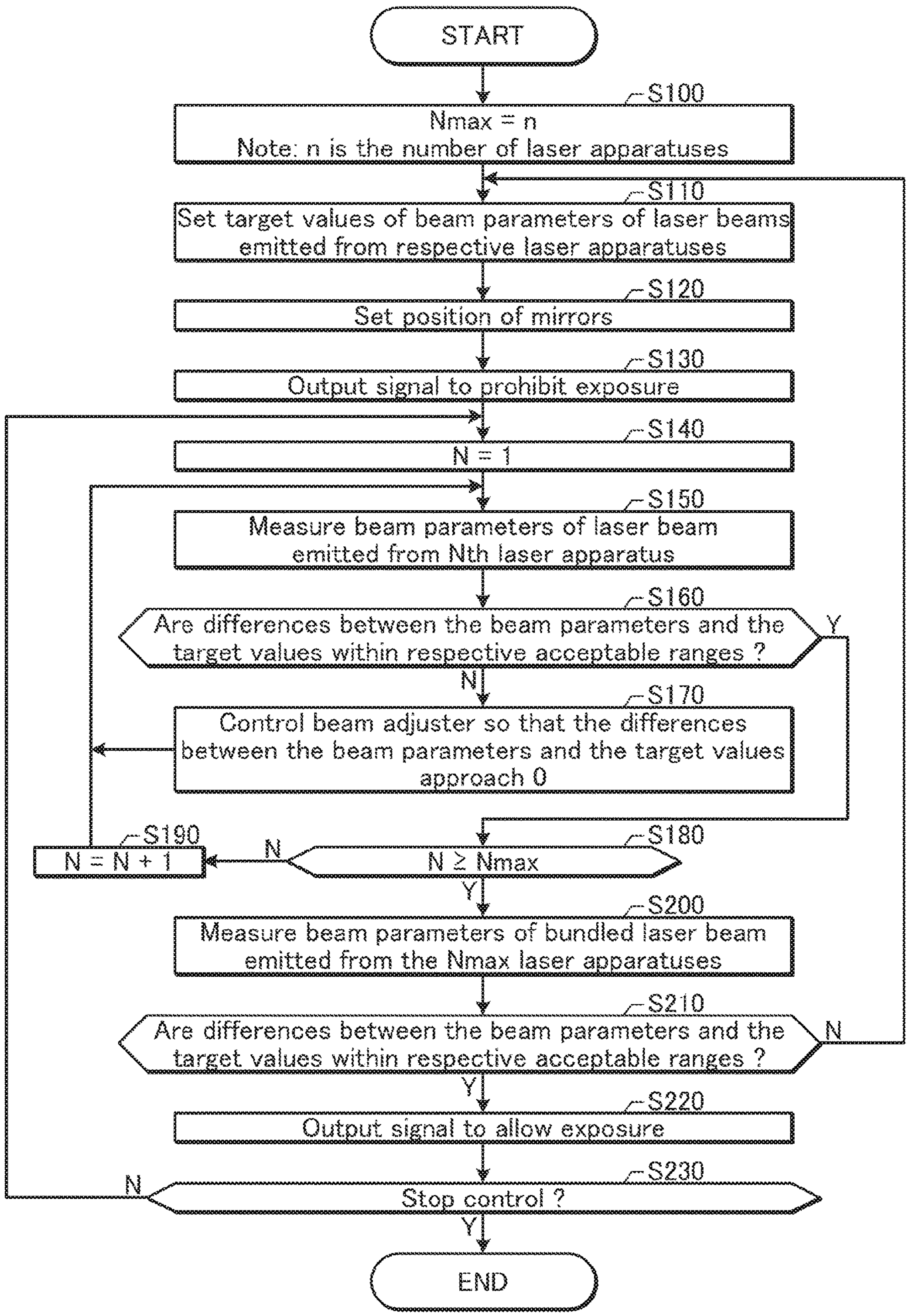
FIG. 16 is a flowchart illustrating an operation of the beam delivery device controller 59 shown in FIG. 1.

FIG. 16 is a flowchart illustrating an operation of the beam delivery device controller 59 shown in FIG. 1. The beam delivery device controller 59 may control the beam parameters of the bundled laser beam, formed by combining the pulse laser beams which are emitted from the laser apparatuses 2*a* to 2*f*, to target values in the following processing.

First, at S100, the beam delivery device controller 59 may set a maximum value Nmax of a counter N to n. Here, n may correspond to the number of the laser apparatuses. The number of the laser apparatuses may be 6 as in the example shown in FIG. 2A.

Next, at S110, the beam delivery device controller 59 may set the target values of the beam parameters of the pulse laser beams 21*a* to 21*f* emitted from the laser apparatuses 2*a* to 2*f*. The target values of the beam parameters may include pointing, beam divergence, beam size, and beam position, of each of the pulse laser beams 21*a* to 21*f*. The beam delivery device controller 59 may further set the target values of the beam parameters of the bundled laser beam, including the pulse laser beams 21*a* to 21*f* emitted from the respective laser apparatuses 2*a* to 2*f*.

Next, at S120, the beam delivery device controller 59 may set positions of the mirrors 9*a* to 9*f*. The positions of the mirrors 9*a* to 9*f* to be set may include the gap between the first and third mirrors 9*a* and 9*c*, the gap between the second and fourth mirrors 9*b* and 9*d*, and the gap between the fifth and sixth mirrors 9*e* and 9*f*.

Next, at S130, the beam delivery device controller 59 may output a signal to prohibit exposure. The signal to prohibit exposure may be sent from the beam delivery device controller 59, via the laser system controller 20, to the exposure apparatus controller 40.

Next, at S140, the beam delivery device controller 59 may set the value of the counter N to an initial value 1.

Next, at S150, the beam delivery device controller 59 may measure the beam parameters of the laser beam emitted from the Nth laser apparatus by the beam parameter measuring device 6.

Next, at S160, the beam delivery device controller 59 may determine whether each of differences between the beam parameters measured at S150 and the respective target values set at S110 is within an acceptable range.

If each of the differences between the beam parameters and the respective target values is not within the acceptable range (S160: NO), the beam delivery device controller 59 may control, at S170, the Nth beam adjuster of the beam adjusters 7*a* to 7*f* such that each of the differences between the beam parameters and the respective target values approaches 0. Further, the beam delivery device controller 59 may control the mirror-moving mechanism 90 such that each of the differences between the beam parameters and the respective target values approaches 0.

After S170, the beam delivery device controller 59 may return to the above S150.

If each of the differences between the beam parameters and the respective target values is within the acceptable range (S160: YES), the beam delivery device controller 59 may determine, at S180, whether a value of the counter N is equal to or more than the maximum value Nmax. If the value of the counter N is not equal to or more than the maximum value Nmax (S180: NO), the beam delivery device controller 59 may add 1 to update the value of the counter N at S190, and then return to the above S150. If the value of the counter N is equal to or more than the maximum value Nmax (S180: YES), the beam delivery device controller 59 may proceed to S200.

At S200, the beam delivery device controller 59 may measure the beam parameters of the bundled laser beam, including the pulse laser beams emitted from the respective Nmax laser apparatuses 2*a* to 2*f*, by the beam parameter measuring device 6.

Next, at S210, the beam delivery device controller 59 may determine whether each of differences between the beam parameters of the bundled laser beam measured at S200 and the respective target values set at S110 is within an acceptable range.

If each of the differences between the beam parameters and the respective target values is not within the acceptable range (S210: NO), the beam delivery device controller 59 may return to the above S110, and reset the target values of the beam parameters.

If each of the differences between the beam parameters and the respective target values is within the acceptable range (S210: YES), the beam delivery device controller 59 may output, at S220, a signal to allow exposure. The signal to allow exposure may be sent from the beam delivery device controller 59, via the laser system controller 20, to the exposure apparatus controller 40.

Next, at S230, the beam delivery device controller 59 may determine whether the control should be stopped. If the control should not be stopped (S230: NO), the beam delivery device controller 59 may return to the above S140. If the control should be stopped (S230: YES), the beam delivery device controller 59 may terminate the processing of this flowchart.

13. Configuration of Controller

Figure 17:
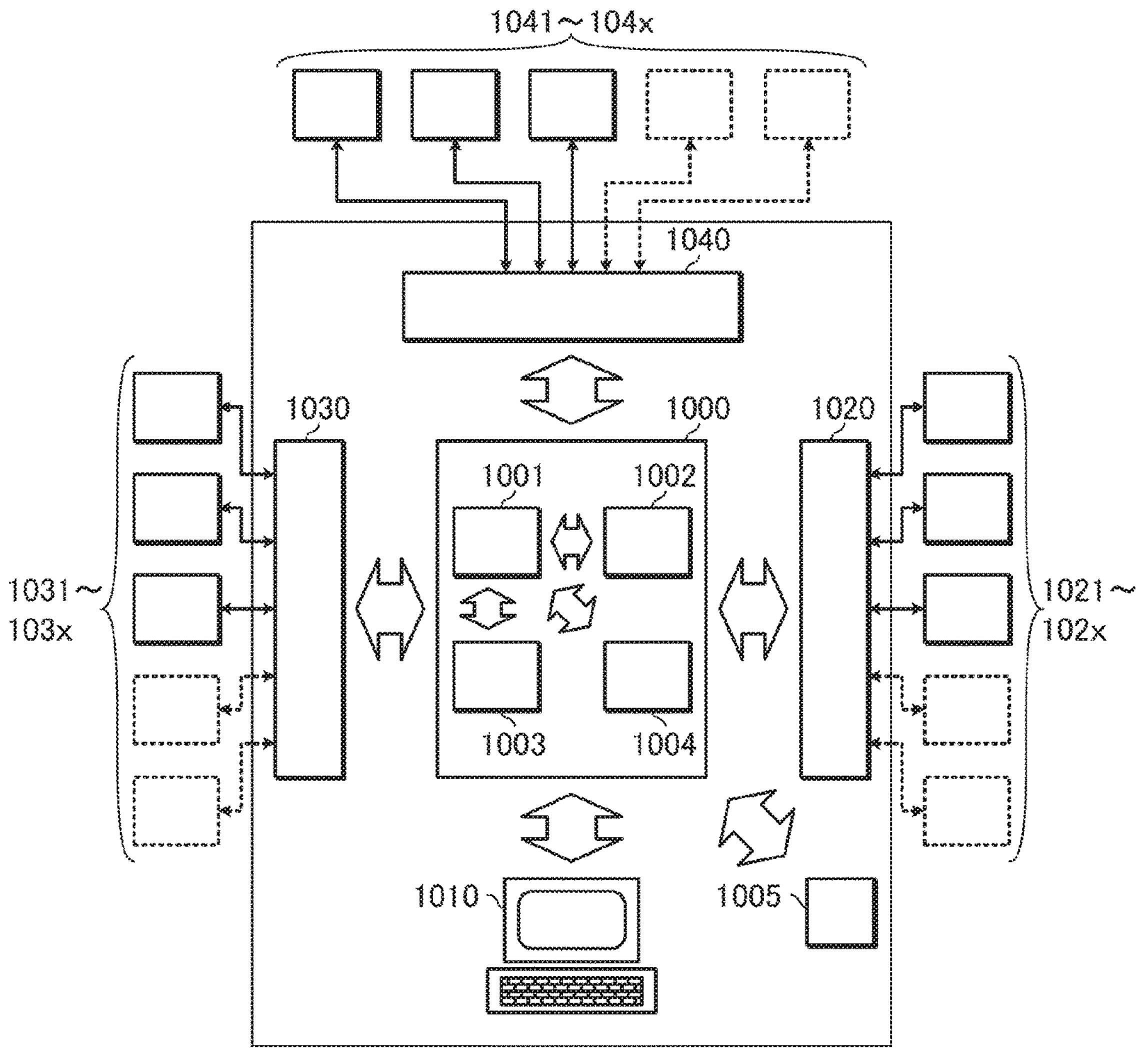
FIG. 17 is a block diagram schematically illustrating a configuration of the controller.

FIG. 17 is a block diagram schematically illustrating a configuration of the controller.

A controller, such as the laser system controller 20 or the beam delivery device controller 59, in the above-mentioned embodiments may be constituted by a general-purpose control device, such as a computer or a programmable controller. For example, the controller may be constituted as described below.

(Configuration)

The controller may include a processor 1000 and other elements connected to the processor 1000. Such elements may include a storage memory 1005, a user interface 1010, a parallel input/output (I/O) controller 1020, a serial I/O controller 1030, and an analog-to-digital (A/D) and digital-to-analog (D/A) converter 1040. The processor 1000 may include a central processing unit (CPU) 1001 and other elements connected to the CPU 1001 including a memory 1002, a timer 1003, and a graphics processing unit (GPU) 1004.

(Operation)

The processor 1000 may read out programs stored in the storage memory 1005. The processor 1000 may execute the read-out programs, read out data from the storage memory 1005 in accordance with the execution of the programs, or store data in the storage memory 1005.

The parallel I/O controller 1020 may be connected to devices 1021 to 102*x* communicable through parallel I/O ports. The parallel I/O controller 1020 may control communication using digital signals through the parallel I/O ports that is performed in the process where the processor 1000 executes programs.

The serial I/O controller 1030 may be connected to devices 1031 to 103*x* communicable through serial I/O ports. The serial I/O controller 1030 may control communication using digital signals through the serial I/O ports that is performed in the process where the processor 1000 executes programs.

The A/D and D/A converter 1040 may be connected to devices 1041 to 104*x* communicable through analog ports. The A/D and D/A converter 1040 may control communication using analog signals through the analog ports that is performed in the process where the processor 1000 executes programs.

The user interface 1010 may be configured to display progress of executing programs by the processor 1000 to an operator or to receive instructions by the operator to the processor 1000 to stop execution of the programs or to execute interruption processing.

The CPU 1001 of the processor 1000 may perform arithmetic processing of programs. In the process where the CPU 1001 executes programs, the memory 1002 may temporally store programs or temporally store data in the arithmetic process. The timer 1003 may measure time or elapsed time. The timer 1003 may output the time or the elapsed time to the CPU 1001 in accordance with the execution of the programs. When image data is inputted to the processor 1000, the GPU 1004 may process the image data in accordance with the execution of the programs and output the results to the CPU 1001.

The devices 1021 to 102*x* communicable through the parallel I/O ports, which are connected to the parallel I/O controller 1020, may be the first to fifth laser apparatuses 2*a* to 2*e*, the exposure apparatus controller 40, another controller, or the like, and may be used for sending or receiving the oscillation trigger signal or the signal indicating the timing.

The devices 1031 to 103*x* communicable through the serial I/O ports, which are connected to the serial I/O controller 1030, may be the first to fifth laser apparatuses 2*a* to 2*e*, the exposure apparatus controller 40, another controller, or the like, and may be used for sending or receiving data.

The devices 1041 to 104*x* communicable through the analog ports, which are connected to the A/D and D/A converter 1040, may be various sensors, such as the beam parameter measuring device 6, the pulse energy measuring unit 17, or the like.

With the above-mentioned configuration, the controller may be capable of achieving the operation illustrated in each of the embodiments.

The aforementioned descriptions are intended to be taken only as examples, and are not to be seen as limiting in any way. Accordingly, it will be clear to those skilled in the art that variations on the embodiments of the present disclosure may be made without departing from the scope of the appended claims.

The terms used in the present specification and in the entirety of the scope of the appended claims are to be interpreted as not being limiting. For example, wording such as "includes" or "is included" should be interpreted as not being limited to the item that is described as being included. Furthermore, "has" should be interpreted as not being limited to the item that is described as being had. Furthermore, the modifier "a" or "an" as used in the present specification and the scope of the appended claims should be interpreted as meaning "at least one" or "one or more".

The invention claimed is:

1. A laser system comprising first and second laser apparatuses, a beam delivery device, and a moving mechanism, wherein:

the first laser apparatus is provided so as to emit a first laser beam to the beam delivery device in a first direction;

the second laser apparatus is provided so as to emit a second laser beam to the beam delivery device in a direction substantially parallel to the first direction;

the beam delivery device includes first and second mirrors provided substantially parallel to each other;

the first mirror is provided so as to reflect the first laser beam to a beam delivery direction different from the first direction;

the second mirror is provided so as to reflect the second laser beam to the beam delivery direction;

the beam delivery device is configured to bundle the first and second laser beams and to emit the first and second laser beams to the beam delivery direction; and the moving mechanism is configured to move the second mirror along an optical path of the second laser beam in a direction substantially parallel to the first direction.

2. A laser system comprising first to fourth laser apparatuses, a beam delivery device, and a moving mechanism, wherein:

the first laser apparatus is provided so as to emit a first laser beam to the beam delivery device in a first direction;

the second laser apparatus is provided so as to emit a second laser beam to the beam delivery device in a direction substantially parallel to the first direction;

the third laser apparatus is provided so as to emit a third laser beam to the beam delivery device in a second direction different from the first direction;

the fourth laser apparatus is provided so as to emit a fourth laser beam to the beam delivery device in a direction substantially parallel to the second direction;

the beam delivery device includes first and second mirrors provided substantially parallel to each other, and third and fourth mirrors provided substantially parallel to each other;

the first mirror is provided so as to reflect the first laser beam to a beam delivery direction different from both of the first direction and the second direction;

the second mirror is provided so as to reflect the second laser beam to the beam delivery direction;

the third mirror is provided so as to reflect the third laser beam to the beam delivery direction; and the fourth mirror is provided so as to reflect the fourth laser beam to the beam delivery direction;

the beam delivery device is configured to bundle the first to fourth laser beams and to emit the first to fourth laser beams to the beam delivery direction; and the moving mechanism is configured to move the second mirror and the fourth mirror so as to change the gap between the second mirror and the fourth mirror, the second mirror being moved along an optical path of the second laser beam in a direction substantially parallel to the first direction, the fourth mirror being moved along an optical path of the fourth laser beam in a direction substantially parallel to the second direction.

3. The laser system according to claim 2, wherein the beam delivery device is configured such that the first laser beam reflected by the first mirror in the beam delivery direction and the third laser beam reflected by the third mirror in the beam delivery direction pass through a gap between the second mirror and the fourth mirror and are emitted from the beam delivery device.

4. The laser system according to claim 2, wherein an optical path axis of the first laser beam reflected by the first mirror in the beam delivery direction and an optical path axis of the third laser beam reflected by the third mirror in the beam delivery direction are positioned in a first plane substantially parallel to the beam delivery direction.

5. The laser system according to claim 4, wherein an optical path axis of the second laser beam reflected by the second mirror in the beam delivery direction and an optical path axis of the fourth laser beam reflected by the fourth mirror in the beam delivery direction are positioned in a second plane substantially parallel to and distanced from the first plane.

6. The laser system according to claim 1, wherein the first mirror has a first reflective surface on which the first laser beam is incident, and a first adjacent surface contacting the first reflective surface at an angle of 45 degrees or less; and the second mirror has a second reflective surface on which the second laser beam is incident, and a second adjacent surface contacting the second reflective surface at an angle of 45 degrees or less.

7. The laser system according to claim 2, wherein the first mirror has a first reflective surface on which the first laser beam is incident, and a first adjacent surface contacting the first reflective surface at an angle of 45 degrees or less;

the second mirror has a second reflective surface on which the second laser beam is incident, and a second adjacent surface contacting the second reflective surface at an angle of 45 degrees or less;

the third mirror has a third reflective surface on which the third laser beam is incident, and a third adjacent surface contacting the third reflective surface at an angle of 45 degrees or less; and the fourth mirror has a fourth reflective surface on which the fourth laser beam is incident, and a fourth adjacent surface contacting the fourth reflective surface at an angle of 45 degrees or less.

8. A laser system comprising first and second laser apparatuses and a beam delivery device, wherein:

the first laser apparatus is provided so as to emit a first laser beam to the beam delivery device;

the second laser apparatus is provided so as to emit a second laser beam to the beam delivery device; and the beam delivery device is configured to bundle the first and second laser beams and to emit the first and second laser beams to a beam delivery direction;

the first laser beam emitted from the beam delivery device has a first section perpendicular to the beam delivery direction, the first section having a first long axis substantially parallel to a third direction and a first short axis shorter than the first long axis substantially parallel to a fourth direction;

the second laser beam emitted from the beam delivery device has a second section perpendicular to the beam delivery direction, the second section having a second long axis substantially parallel to the third direction and a second short axis shorter than the second long axis substantially parallel to the fourth direction; and the first section and the second section are aligned in the fourth direction.

9. The laser system according to claim 8, wherein:

the first laser apparatus emits the first laser beam in a first direction;

the second laser apparatus emits the second laser beam in a direction substantially parallel to the first direction; and the beam delivery device bundles the first and second laser beams and emits the first and second laser beams to a beam delivery direction different from the first direction.

10. The laser system according to claim 9, wherein:

the beam delivery device includes first and second mirrors provided substantially parallel to each other;

the first mirror is provided so as to reflect the first laser beam to the beam delivery direction; and the second mirror is provided so as to reflect the second laser beam to the beam delivery direction.

11. The laser system according to claim 10, wherein the first mirror has a first reflective surface on which the first laser beam is incident, and a first adjacent surface contacting the first reflective surface at an angle of 45 degrees or less; and the second mirror has a second reflective surface on which the second laser beam is incident, and a second adjacent surface contacting the second reflective surface at an angle of 45 degrees or less.

12. The laser system according to claim 8, further comprising third and fourth laser apparatuses, wherein:

the third laser apparatus emits the third laser beam in a second direction different from the first direction;

the fourth laser apparatus emits the fourth laser beam in a direction substantially parallel to the second direction; and the beam delivery device bundles the first to fourth laser beams and emits the first to fourth laser beams to a beam delivery direction different from both of the first direction and the second direction.

13. The laser system according to claim 12, wherein:

the beam delivery device includes first and second mirrors provided substantially parallel to each other, and third and fourth mirrors provided substantially parallel to each other;

the first mirror is provided so as to reflect the first laser beam to the beam delivery direction;

the second mirror is provided so as to reflect the second laser beam to the beam delivery direction;

the third mirror is provided so as to reflect the third laser beam to the beam delivery direction; and the fourth mirror is provided so as to reflect the fourth laser beam to the beam delivery direction.

14. The laser system according to claim 13, wherein the beam delivery device is configured such that the first laser beam reflected by the first mirror in the beam delivery direction and the third laser beam reflected by the third mirror in the beam delivery direction pass through a gap between the second mirror and the fourth mirror and are emitted from the beam delivery device.

15. The laser system according to claim 14, further comprising a moving mechanism configured to move the second mirror and the fourth mirror so as to change the gap between the second mirror and the fourth mirror, the second mirror being moved along an optical path of the second laser beam, the fourth mirror being moved along an optical path of the fourth laser beam.

16. The laser system according to claim 13, wherein an optical path axis of the first laser beam reflected by the first mirror in the beam delivery direction and an optical path axis of the third laser beam reflected by the third mirror in the beam delivery direction are positioned in a first plane substantially parallel to the beam delivery direction.

17. The laser system according to claim 16, wherein an optical path axis of the second laser beam reflected by the second mirror in the beam delivery direction and an optical path axis of the fourth laser beam reflected by the fourth mirror in the beam delivery direction are positioned in a second plane substantially parallel to and distanced from the first plane.

18. The laser system according to claim 13, wherein the first mirror has a first reflective surface on which the first laser beam is incident, and a first adjacent surface contacting the first reflective surface at an angle of 45 degrees or less;

the second mirror has a second reflective surface on which the second laser beam is incident, and a second adjacent surface contacting the second reflective surface at an angle of 45 degrees or less;

the third mirror has a third reflective surface on which the third laser beam is incident, and a third adjacent surface contacting the third reflective surface at an angle of 45 degrees or less; and the fourth mirror has a fourth reflective surface on which the fourth laser beam is incident, and a fourth adjacent surface contacting the fourth reflective surface at an angle of 45 degrees or less.

* * * * *